(12) United States Patent
Abegglen et al.

(10) Patent No.: US 9,745,120 B2
(45) Date of Patent: Aug. 29, 2017

(54) BEVERAGE CAPSULE FOR PREPARING A BEVERAGE BY CENTRIFUGATION IN A BEVERAGE PREPARATION DEVICE

(75) Inventors: Daniel Abegglen, Rances (CH); Arnaud Gerbaulet, Oye et Pallet (FR); Jean-Francois Tinembart, Yverdon (CH); Alexandre Perentes, Lausanne (CH)

(73) Assignee: Nestec S.A., Vevey (CH)

( * ) Notice: Subject to any disclaimer, the term of this patent is extended or adjusted under 35 U.S.C. 154(b) by 105 days.

(21) Appl. No.: 14/009,249

(22) PCT Filed: Mar. 29, 2012

(86) PCT No.: PCT/EP2012/055609
§ 371 (c)(1),
(2), (4) Date: Oct. 1, 2013

(87) PCT Pub. No.: WO2012/130928
PCT Pub. Date: Oct. 4, 2012

(65) Prior Publication Data
US 2014/0370161 A1 Dec. 18, 2014

(30) Foreign Application Priority Data

Apr. 1, 2011 (EP) .................................... 11160908
Oct. 4, 2011 (EP) .................................... 11183807

(51) Int. Cl.
*B65D 85/804* (2006.01)
*A47J 31/22* (2006.01)

(52) U.S. Cl.
CPC .......... *B65D 85/8043* (2013.01); *A47J 31/22* (2013.01)

(58) Field of Classification Search
CPC ..... B65D 85/804; B65D 85/8043; A47J 31/22
(Continued)

(56) References Cited

U.S. PATENT DOCUMENTS

2010/0203198 A1\* 8/2010 Yoakim .................. A47J 31/22
426/80

FOREIGN PATENT DOCUMENTS

WO  WO 2008148604 A1 \* 12/2008
WO  WO 2008148646 A1 \* 12/2008
(Continued)

*Primary Examiner* — Michele L Jacobson
*Assistant Examiner* — Ericson M Lachica
(74) *Attorney, Agent, or Firm* — K&L Gates LLP

(57) ABSTRACT

Beverage capsule for preparing a beverage in a beverage preparation device from a capsule containing beverage ingredients by passing water through the ingredients contained in the capsule using centrifugal forces, said device comprising means for driving the capsule in rotation around an axis of rotation (I), a capsule holder for receiving the capsule and a water injection means for injecting water in the capsule, said device further comprising a valve means for engaging a valve engaging portion of the capsule; said valve means comprising a pressing ring; the capsule comprising a body and a lid and a valve engaging portion designed for being inserted between the capsule holder and the valve means of the device; wherein said capsule comprises an outlet structure forming beverage flow restriction passages of defined cross-section in the capsule at such and/or as a result of the insertion of the valve engaging portion between the capsule holder and the pressing ring of the valve means.

8 Claims, 20 Drawing Sheets

(58) Field of Classification Search
USPC ............... 426/77, 78, 79, 80, 81, 82, 83, 84; 99/295, 302 C, 300, 301, 287
See application file for complete search history.

(56) References Cited

FOREIGN PATENT DOCUMENTS

| WO | 2010026045 | 3/2010 |
| WO | 2010026053 | 3/2010 |
| WO | 2010066705 | 6/2010 |

* cited by examiner

BEVERAGE CAPSULE FOR PREPARING A BEVERAGE BY CENTRIFUGATION IN A BEVERAGE PREPARATION DEVICE

CROSS REFERENCE TO RELATED APPLICATIONS

The present application is a National Stage of International Application No. PCT/EP2012/055609, filed on Mar. 29, 2012, which claims priority to European Patent Application No. 11160908.7, filed Apr. 1, 2011, and European Patent Application No. 11183807.4, filed Oct. 4, 2011, the entire contents of which are being incorporated herein by reference.

FIELD OF THE INVENTION

The present invention relates to a capsule for preparing a beverage from beverage ingredients contained in a capsule by inserting the capsule in a beverage preparation device and by passing water through the ingredients using centrifugal forces. The invention further relates to a system comprising a capsule and a beverage preparation device.

TECHNICAL BACKGROUND

The preparation of a beverage by a capsule containing beverage ingredients is known. In general, the capsule is inserted in a beverage production device, such as a coffee machine, liquid is fed in the capsule, the liquid interacts with the beverage ingredients and a beverage is extracted from the capsule under pressure or by gravity.

The preparation of a beverage by using centrifugation is also known. In general, the principle consists in providing beverage ingredients in a container of the capsule, feeding liquid (i.e., water) in the receptacle and rotating the receptacle at elevated speed to ensure interaction of liquid with ingredients so as to create a gradient of pressure of liquid in the receptacle; such pressure increasing gradually from the centre towards the periphery of the receptacle. As liquid traverses the coffee bed, extraction of the coffee compounds takes place and a liquid extract is obtained that flows out at the periphery of the receptacle.

A capsule system and method for preparing a beverage from a capsule using centrifugation forces is described in the following documents: EP2210539, WO2008/148604, WO2008148650, WO2008/148646, WO2008/148656 and WO2010/026045.

WO 2008/148646 relates to an improvement of the preparation of a beverage by centrifugation wherein a capsule system is proposed. In particular, the system comprises a device for receiving a capsule containing beverage ingredients; said capsule being driven in rotation in the device and flow restriction means, in particular, a valve means, being provided in the flow path of the centrifuged liquid for maintaining a gradient of pressure in the capsule. In particular, the valve means is formed by a spring-biased ring of the device engaging on a portion of rim of the capsule. The valve means is controlled in such a manner that the pressure of the centrifuged liquid forces the valve means to open. In particular, the ring is moved against spring-biasing means by the centrifuged beverage forcing a flow path between the rim portion and the pressing ring. As a result, a control of the flow rate of the beverage is made possible thereby enabling the production of a wide range of different possible beverages (e.g. different coffee beverages).

The term "capsule" refers to any flexible, rigid or semi-rigid packaging container containing beverage ingredients. Other synonymous to a capsule are: "pod", "pad", "cartridge" or "sachet". The capsule can be designed for a single use. The container can also be filled with ingredients by the user to form the capsule just before use.

The term "beverage ingredients" means any suitable beverage substance such as ground coffee, soluble coffee, leaf tea, soluble tea, herbal tea, dairy powder, culinary powder, baby food and combinations thereof.

SUMMARY OF THE INVENTION

The present invention aims at proposing an alternative system solution, in which a new capsule is designed to fit in an existing device for delivering a beverage from the capsule through a beverage flow restriction path that regulates the flow rate of the beverage leaving the capsule but without activating (i.e., opening) the valve to create a variable flow path under the pressure of the centrifuged liquid. The advantage is that the opening cross-section provided by the flow restriction is predetermined by the capsule itself and/or by the engagement of the capsule in the device and is made independent from the operational parameters set in the device such as the pressure in the capsule and/or the rotational speed. As a result, a simpler control of the brewing parameters, in particular, the flow rate can be obtained.

The invention is broadly defined by the independent claims. The dependent claims further define characteristics of the invention.

In particular, the invention relates to a beverage capsule for preparing a beverage in a beverage preparation device from a capsule containing beverage ingredients by passing water through the ingredients contained in the capsule using centrifugal forces, said device comprising means for driving the capsule in rotation around an axis of rotation (I), a capsule holder for receiving the capsule and a water injection means for injecting water in the capsule, said device further comprising a resilient valve means for engaging a valve engaging portion of the capsule; said valve means comprising a pressing ring;

the capsule comprising a body and a lid delimiting a compartment containing beverage ingredients and a valve engaging portion designed for being inserted between the capsule holder and the valve means of the device;

wherein said capsule comprises an outlet structure forming beverage flow restriction passages of defined cross-section in the capsule obtained at such and/or as a result of the insertion of the valve engaging portion between the capsule holder and the pressing ring of the valve means, wherein the valve engaging portion of the capsule has an axial dimension such that, before the extraction of the beverage from the capsule, the pressing ring of the valve means is stressed by the valve engaging portion to an axial force and/or axial distance such that, during the extraction by rotating the capsule in the device, the pressing ring no longer moves by the pressure of the centrifuged beverage on the valve means within the operational rotational speed and the flow of beverage is only funneled through the said flow restriction passages.

The invention may also be defined as a beverage capsule for preparing a beverage in a beverage preparation device from a capsule containing beverage ingredients by passing water through the ingredients contained in the capsule using centrifugal forces, said device comprising means for driving the capsule in rotation around an axis of rotation (I), a capsule holder for receiving the capsule and a water injection means for injecting water in the capsule, said device further comprising a resilient valve means for engaging a valve engaging portion of the capsule; said valve means comprising a pressing ring;

the capsule comprising a body and a lid delimiting a compartment containing beverage ingredients and a valve engaging portion designed for being inserted between the capsule holder and the valve means of the device;

wherein said capsule comprises an outlet structure forming beverage flow restriction passages of defined cross-section in the capsule obtained at such and/or as a result of the engagement of the valve engaging portion with the capsule holder and the pressing ring of the valve means, wherein the valve engaging portion has an axial dimension of at least 5 mm.

Preferably, the capsule comprises a flange, at least a part of which is formed by the valve engaging portion. Furthermore, the outlet structure is provided on and/or through the flange, more preferably on and/or through the valve engaging portion.

Preferably, the valve engaging portion of the capsule is designed for pre-stressing the valve means of the beverage preparation device, when the capsule is inserted between the capsule holder and the valve means, to such an extent that the pressing ring abuts against a fully compressed elastic means and/or against a solid abutment portion of the device.

In a preferred configuration of the capsule system, the valve engaging portion extends outwardly and upwardly above a transversal flange portion of the capsule. The valve engaging portion preferably further extends downwardly below the flange portion of the capsule. In such case, the valve engaging portion extends axially beyond each side of the flange portion of the capsule.

In a preferred mode, the valve engaging portion has an axial length of at least 5 mm. Such length value is determined to ensure that the engagement of the engaging portion of the capsule in the valve means results in a substantially full compression of the elastic means by the pressing ring and consequently results in a blockage of the valve means, at least within the operational range of rotational speeds of the device. Of course, the axial length may vary depending on the spring characteristics of the valve means and/or the geometry of the valve means (in particular, the ability of the valve means to geometrically displace).

The operational rotational speed range of the capsule in the device is considered as the rotation speed of the capsule in the device during extraction of the centrifuged beverage out of the capsule and is lower than 8000 rpm.

Preferably, the outlet structure of the engaging portion defines flow restriction passages that determine a total flow opening cross-section for the beverage of less than 5 mm$^2$, preferably comprised between 2 and 0.1 mm$^2$, most preferably between 1 and 0.2 mm$^2$. Such upper limit of the total flow opening cross-section ensures a pressure gradient in the capsule and enables to maintain a sufficiently low flow rate during centrifugation to ensure the beverage quality (e.g., good coffee extraction). In particular, the flow rate can be maintained below 5 ml/second, preferably between 0.5 and 2 ml/second when the rotational speed range of the capsule in the device is comprised between 2500 and 6000 rpm. Such outlet structure can be obtained by grooves, knurls, spikes, studs and combinations thereof provided on a surface of the valve engaging portion or by openings provided through the valve engaging portion or combinations thereof.

In a mode, the outlet structure is formed on a top surface or edge of the valve engaging portion; said top surface or edge being arranged to come in abutment against the pressing ring of the valve means of the device when the capsule is inserted in the device. In such case, the restriction of the flow of the centrifuged beverage is delimited by the engagement of the capsule in the device, more particularly by the surface of the ring portion of the valve means contacting the top surface or edge of the valve engaging portion of the capsule. For example, the outlet structure can be formed by grooves distributed on the periphery of the engaging portion. In an alternative, the outlet means can be formed by knurls provided on the top surface or edge of the engaging portion. Such grooves or knurls are preferably arranged radially to guide the flow of centrifuged beverage off the capsule under the effect of the forces of centrifugation. Other possible structures can create a labyrinth-type structure for the beverage flow path such as obtained by grooves, knurls, spikes, studs and any equivalent structure in relief or recess provided on the top surface or edge of the engaging portion.

The outlet structure can be produced by casting, milling, laser or chemical etching or sanding.

In another mode, the outlet structure is formed by openings delimited between a cup-shaped body and a lid of the capsule connected to the body. In particular, the outlet structure forms openings of controllably variable cross-section. The cross-section of such openings can be varied, for example, by a relative movement of the lid and body such as by rotation of the lid relative to the body. This relative movement can be applied manually by the user or by a relative displacement of a part of the device after insertion of the capsule in the device. The benefit for providing openings of variable cross-section is to offer the possibility to vary the pressure distribution in the capsule as well as the flow rate of the beverage. It can also be that the openings are of different cross-sections within a set of different capsules. In this case, the user selects a capsule amongst the capsules of the set which has openings of predefined cross-section.

The outlet structure can also be formed of radial grooves, knurls, spikes, studs or combinations thereof provided on the bottom surface or edge of the valve engaging portion; said surface or edge being designed for coming in abutment against a support surface of the capsule holder. In addition, the capsule may further comprise openings provided through the sidewall of its body. In such a mode, the centrifuged beverage traverses the sidewall of the capsule and, then, is guided through the flow restriction passages formed, by such outlet structure, between the valve engaging portion of the capsule and the capsule holder.

The outlet structure can also be formed of at least one layer of porous material such as a woven or non woven, filter paper, sponge or foam. Such layer of porous material can be inserted in at least one opening formed between the lid and the body of the capsule. As an alternative, the layer may be applied onto the top surface and/or bottom surface of the engaging portion of the capsule. It may be sufficiently rigid to leave flow restriction passages in radial directions when the layer is pressed under the compressive forces of the valve means of the device.

In a possible mode, the lid comprises a transversal portion which is positioned, towards the cavity of the capsule, inset relative to the flange of the capsule in order to form a recess below extraction perforating means of the device (e.g., needles, blades or pyramids) when the capsule is in insertion position in the device; said transversal portion of the lid further comprising filtering openings located at its periphery for filtering the beverage leaving the compartment.

The invention also relates to a capsule kit comprising a beverage capsule and a separate insert.

In particular, the invention relates to a beverage capsule kit for preparing a beverage in a beverage preparation device comprising from a capsule containing beverage ingredients by passing water through the ingredients contained in the capsule using centrifugal forces, said kit comprising a capsule and an insert separable or separate from the capsule comprising a valve engaging portion, said device comprising means for driving the capsule in rotation around an axis of rotation (I), a capsule holder for receiving the capsule and a water injection means for injecting water in the capsule, said device further comprising a resilient valve means for engaging the said valve engaging portion of the insert; said valve means comprising a pressing ring;

the capsule comprising a body and a lid delimiting a compartment containing beverage ingredients, said valve engaging portion of the insert being designed for being inserted between the capsule holder and the valve means of the device;

wherein said insert and/or capsule comprises an outlet structure forming beverage flow restriction passages of defined cross-section in the capsule at such and/or as a result of the insertion of the valve engaging portion of the insert between the capsule holder and the pressing ring of the valve means, wherein the valve engaging portion of the capsule has an axial dimension such that, before the extraction of the beverage from the capsule, the pressing ring of the valve means is stressed by the valve engaging portion to an axial force and/or axial distance such that, during the extraction by rotating the capsule in the device, the pressing ring no longer moves by the pressure of the centrifuged beverage on the valve means within the operational rotational speed and the flow of beverage is only funneled through the said flow restriction passages.

The insert may be designed for a single use or multiple uses in the device.

The insert may be connected to the capsule holder such as by gluing, press-fitting, snap-fitting or combinations thereof. It may also be connectable to the capsule in a removable manner, such as by gluing, press-fitting, snap-fitting or combinations thereof, before insertion of the capsule in the beverage preparation device. The insert may also be free of any connection with the device or capsule.

In the kit, the capsule may be free of outwardly protruding flange. The insert may be such that it forms an outwardly protruding flange including the valve engaging portion.

The present invention further includes the combination of a capsule and a beverage preparation device as aforementioned.

In particular, the invention also relates to a beverage capsule system for preparing a beverage from a capsule containing beverage ingredients in a beverage preparation device by passing water through the ingredients contained in the capsule using centrifugal forces comprising:

a device comprising means for driving the capsule in rotation around an axis of rotation (I), a capsule holder for receiving the capsule and a water injection means for injecting water in the capsule, said device further comprising a valve means for engaging a peripheral outlet portion of the capsule; said valve means comprising a pressing ring and an elastic means acting on the pressing ring, a capsule containing beverage ingredients and a valve engaging portion designed for being inserted between the capsule holder and the valve means of the device;

wherein said capsule comprises an outlet structure forming beverage flow restriction passages of defined cross-section in the capsule at such and/or as a result of the insertion of the valve engaging portion between the capsule holder and the pressing ring of the valve means, wherein the valve engaging portion of the capsule has an axial dimension such that, before the extraction of the beverage from the capsule, the pressing ring of the valve means is stressed by the valve engaging portion to an axial force and/or axial distance such that, during the extraction by rotating the capsule in the device, the pressing ring no longer moves by the pressure of the centrifuged beverage on the valve means within the operational rotational speed and the flow of beverage is only funneled through the said flow restriction passages.

Additional features of the invention will appear in the detailed description of the figures which follows.

DETAILED DESCRIPTION OF THE INVENTION

Figure 1:
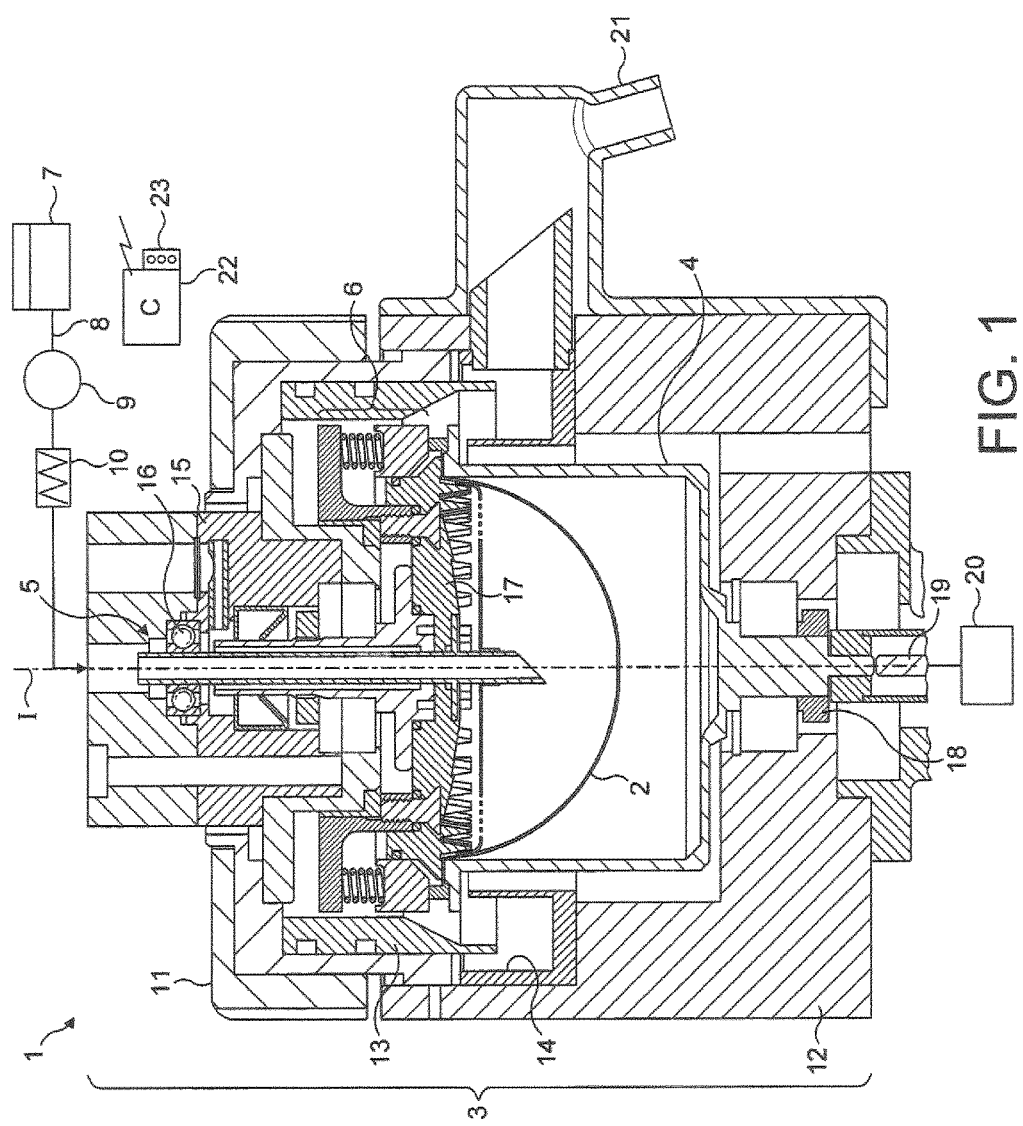
FIG. 1 is a cross-sectional partial view of a beverage capsule system according to the invention.
Figure 2:
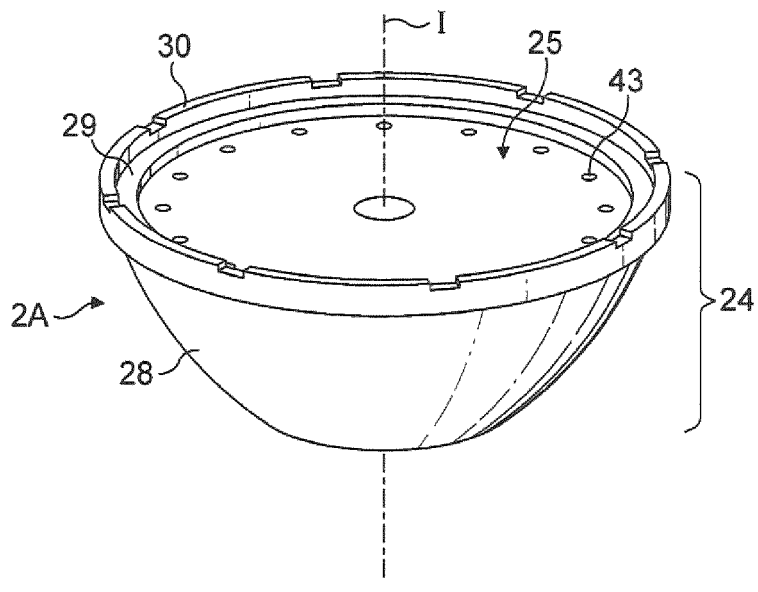
FIG. 2 is a perspective view of a capsule according to a first embodiment of the invention.
Figure 3:
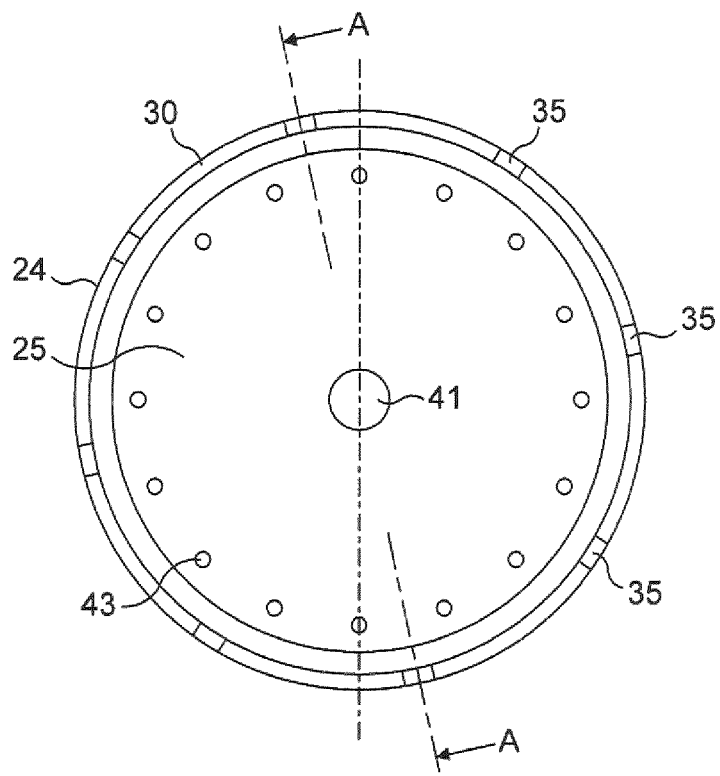
FIG. 3 is a top view of the capsule of FIG. 2.

A general representation of a capsule system 1 of the invention is illustrated on FIG. 1. The system comprises a capsule 2 containing beverage ingredients such as ground coffee powder. The capsule 2 is inserted in a beverage preparation device 3 comprising a capsule holder 4, a water injection device 5 for supplying water in the capsule and a valve means 6. The device further comprises a water reservoir 7 for supplying water in a water circuit 8. Water is circulated in the water circuit 8 by means of a pump 9 and can be heated by a heater 10 to a controlled temperature before it enters into the capsule. In FIG. 1, the capsule is shown in a position of engagement in the device, with the device being closed and ready for centrifuging the capsule; such position which will be described in more detail in relation to FIG. 6.

Concerning the device, it comprises more particularly an upper frame 11 and a lower frame 12 which do not rotate during the centrifugation of the capsule in the device. The upper and lower frames 11, 12 have collecting parts 13, 14 respectively surrounding the capsule onto which the centrifuged beverage is received when leaving the capsule. The collecting part 13 forms a tubular jacket surrounding the capsule and separated from it by a small gap (also called "flying distance"). The second collecting part 14 can be a U-shaped reservoir placed below the first collecting part 13. An upper rotatable part 15 of the device is mounted around the injection means 5 which are static relative to the upper frame. For example, a ball bearing 16 is inserted between the injection means and the part 15. This upper rotatable part 15 comprises a capsule engaging plate 17, e.g., with a convex engaging surface intended for pressing on the upper surface or lid of the capsule. The valve means 6 are mounted around said plate 17 as it will be further described. The lower frame 12 also supports the capsule holder 4 which is rotatably mounted via the ball bearing 18. The capsule holder is connected via an axle 19 to a rotary motor 20. The motor drives the capsule holder 4 and upper part 15 in rotation and consequently the capsule too which is inserted between the parts 15, 4.

The device further comprises a beverage duct 21 which forms an extension of the collecting means, in particular, of U-shaped collector 14. The collected beverage is drained through this duct 21 and received in a receptacle, such as a cup or mug, placed beneath. The device further comprises a control unit 22 and a user interface 23. The unit 22 is programmed to adjust the brewing parameters such as the flow rate, the rotational speed, water temperature, the volume of the beverage and combinations thereof. The unit may receive information from a capsule detection system such as a code associated to the capsule or a capsule size's sensor to control the brewing parameters such as described in European co-pending patent application No. 10170042.5.

A first embodiment of the capsule of the invention is illustrated in FIGS. 2 to 5. The capsule is also shown in engagement in the beverage preparation device on FIGS. 6, 7 and 8. In general, the capsule 2A has a cup-shaped body 24 and a lid 25 connected to the body so as to delimit an inner compartment 26 containing beverage ingredients 27 (e.g., ground coffee). An axis "I" can be defined that traverses the centre of the lid which forms the virtual axis of rotation of the capsule when the capsule is the centrifuged in the device. The body has a cup portion 28 and a flange portion 29 extending outwardly from the capsule. The flange portion 29 may be a part of the body and/or lid. At the free end of the flange is provided a valve engaging portion 30. Such portion 30 may take various shapes. Preferably, it extends axially beyond the flange 29 both above and below. The term "axially" refers to the direction of extension of the axis "I". The terms "above" and "below" are defined in the context of the capsule of the invention, relative to the axial direction when the lid of the capsule is oriented upwardly as represented in the figures.

In particular, the valve engaging portion has a height "h" defined as the maximal height between a top surface or edge 31 and a bottom surface or edge 32. The valve engaging portion has also a width "w" defined as the maximal width between an inner surface 33 and an outer surface 34 both extending beyond the flange 29. The flange portion may not necessary be perpendicular to the axis "I" but may be slightly inclined relative to axis "I". Also the flange portion may not necessary have a constant thickness "t" but may have a variable thickness. It may, for example, merge with the engaging portion 30 progressively or stepwise. Importantly, the valve engaging portion has an outlet structure 35 that predetermines the flow restriction of the centrifuged beverage passing the valve engaging portion. In the present embodiment, the outlet structure 35 is formed of a plurality of grooves 36 provided in the top surface or edge 31. The grooves extend generally in radial directions. The grooves may not necessary be rectilinear in the radial directions. The grooves may, for instance, take a curved shape, a "Z" shape or a shape of labyrinth.

In general (i.e., for this embodiment but also applicable to all other embodiments), the lid comprises a transversal portion 37 in the form of a disc partially closing the compartment. The transversal portion 37 is positioned inset relative to the flange portion 29 to form a recess, at least in the vicinity of the periphery 38 of the lid. The lid may further extend on its side by an upwardly raising edge portion 39. The edge portion 39 is connected to the inner surface of the cup portion of the body such as by welding, gluing, press-fitting and any combinations thereof. Of course, the edge portion 39 can be oriented downwardly below the transversal portion 37 (towards the compartment) or, both upwardly and downwardly both below and above the transversal portion 37.

The centre of the lid may be further provided with a tubular guiding portion 40. This portion serves to guide a water injection member such as a needle of the beverage preparation device. The tubular guiding portion 40 may be closed by a perforable or breakable part or may be open.

At the periphery of the transversal portion of the lid is provided a plurality of openings 43. These openings may be sized to allow beverage release out of the capsule. For example, the openings have a diameter of less than 250 microns, preferably comprised between 50 and 200 microns in order to filter the beverage from the larger non-soluble particles of the ingredients.

Figure 4:
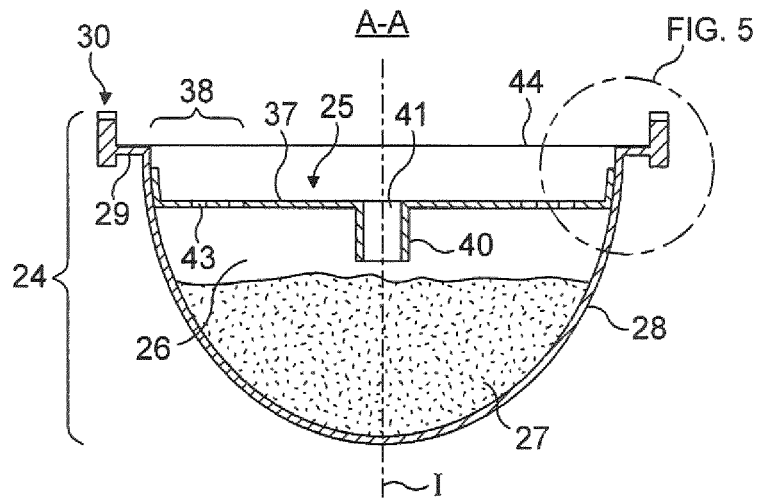
FIG. 4 is a cross sectional view of the capsule along line A-A of FIG. 3.
Figure 5:
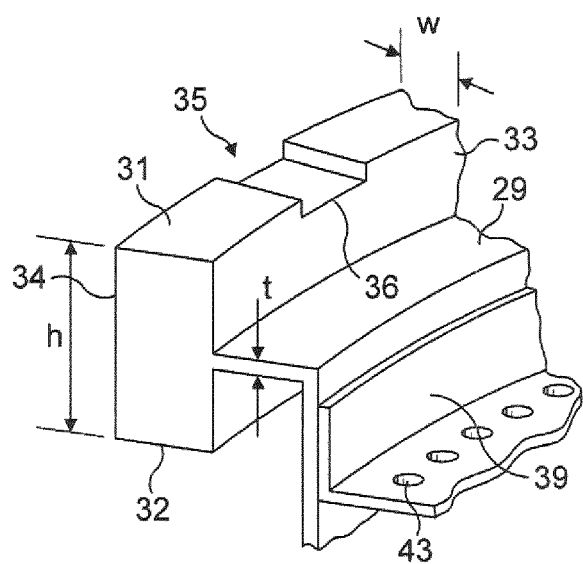
FIG. 5 shows a detail of the capsule of FIGS. 2 to 4.

Finally, an (optional) foil 44 can be provided on top of the capsule covering the lid (FIG. 4). The foil 44 may be impervious to liquid and even preferably to gas. The foil 44 can be connected to the flange portion 29 and/or lid 37. The foil may be designed to be perforated or may be a peel-off membrane.

Figure 6:
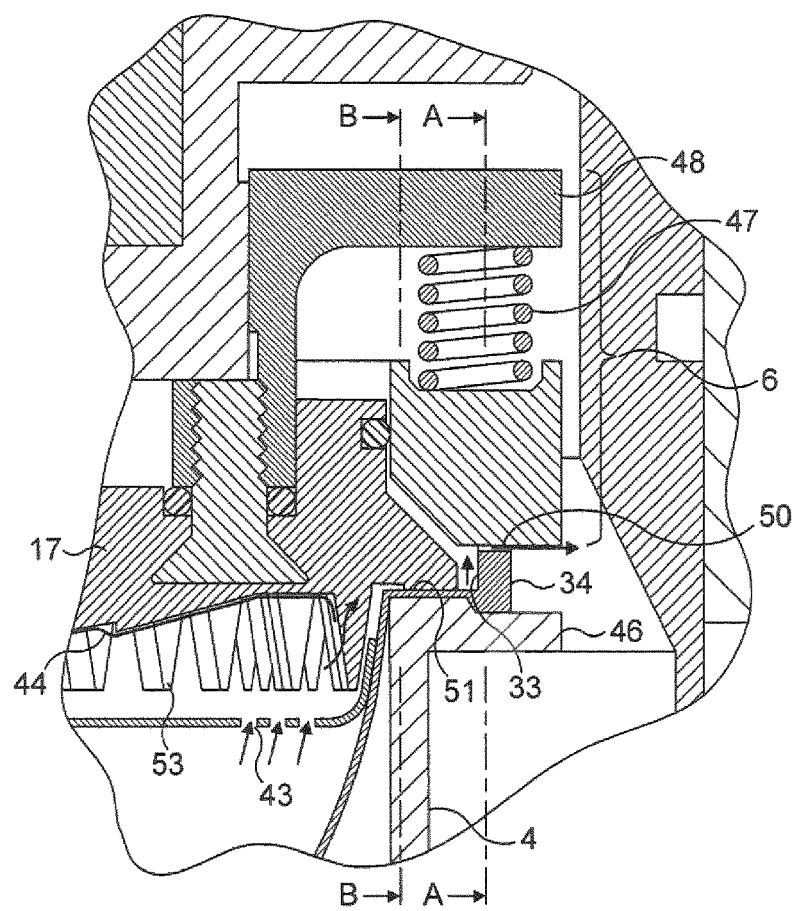
FIG. 6 shows a detail in cross-section of the capsule system using a capsule according to the first embodiment.
Figure 7:
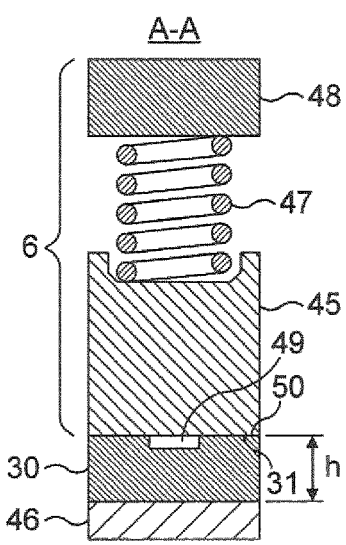
FIG. 7 is a cross-section along line A-A of FIG. 6.
Figure 8:
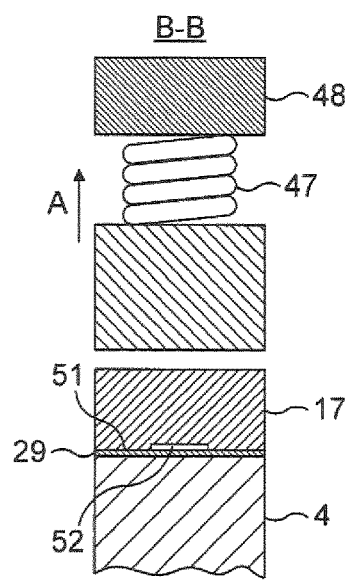
FIG. 8 is a cross-section along line B-B of FIG. 6.
Figure 9:
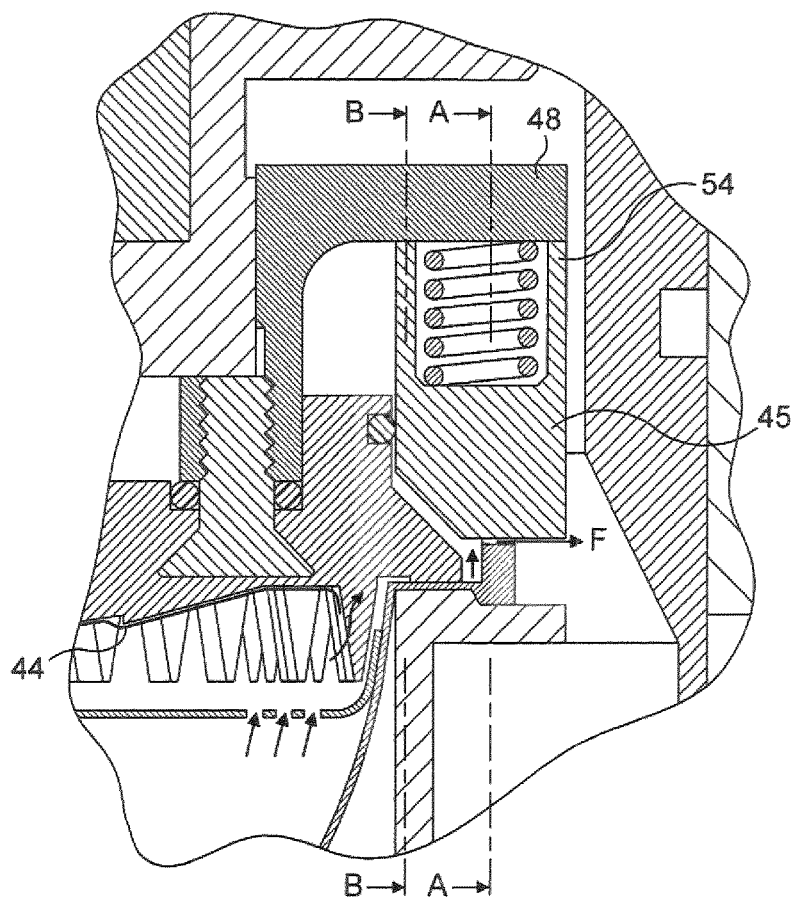
FIG. 9 shows a detail in cross-section of the capsule system using a capsule according to the first embodiment in a variant of the device of FIG. 6.
Figure 10:
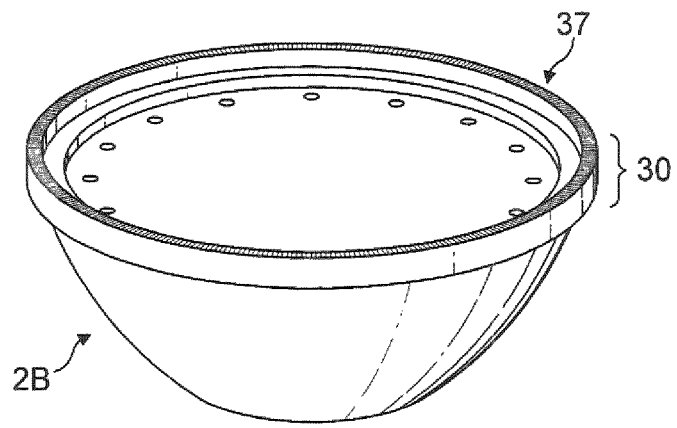
FIG. 10 is a perspective view of a capsule according to a second embodiment of the invention.
Figure 11:
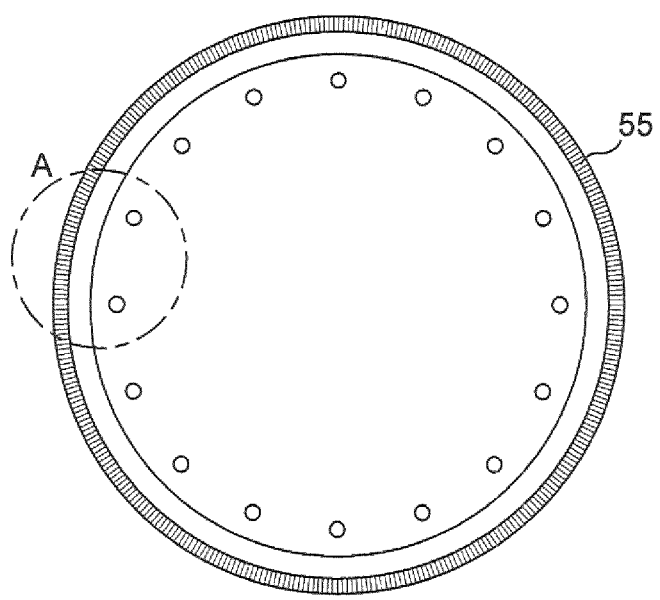
FIG. 11 is a top view of the capsule of FIG. 10.
Figure 12:
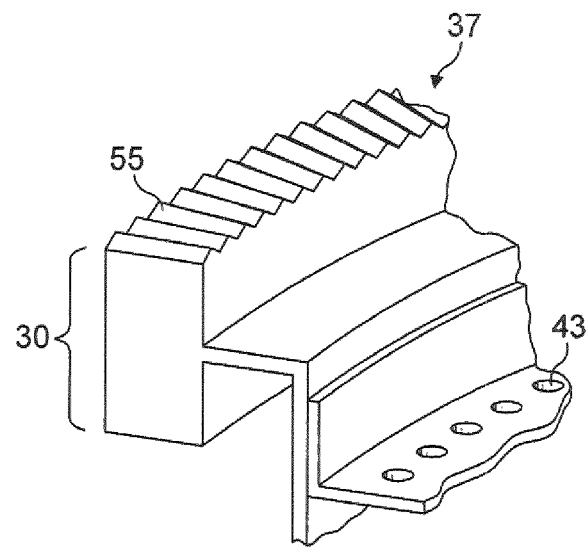
FIG. 12 shows a detail of the capsule of FIGS. 10 and 11.

The device and the engagement of the capsule in the device according to the embodiment of FIGS. 1 to 5 will now be further described in relation to FIGS. 6 to 8. The device comprises a valve means 6. The valve means comprises a pressing ring 45 mounted in axial relationship around the engaging plate 17. The pressing ring can take various spacing positions relative to a supporting flange 46 of the capsule holder 4 depending on the height "h" of the valve engaging portion 30 of the capsule. When a capsule is inserted in the device, the valve engaging portion forces the pressing ring 45 against an elastic means 47, such as a plurality of helical springs or spring-blades distributed along the circumference of the ring. The elastic means is positioned between an abutment portion 48 of the engaging plate 17 and the pressing ring 45. The capsule of the invention is designed in such a manner that the pressing ring is prestressed by the elastic means and cannot be further moved against the elastic means (in upward axial direction or direction A shown in FIG. 8) under the pressure of the beverage when the device is centrifuging the capsule. In other words, the valve means is blocked in a compressed position of the ring. Blocking of the valve means can, for instance, be obtained by fully compressing the helical springs such as, for instance, the coils of the springs 47 comes to a contiguous position (as illustrated in FIG. 8). The valve may be further or alternatively blocked by a mechanical abutment 54 of the pressing ring against the abutment portion 48 as illustrated on FIG. 9. For instance, the height "h" of the valve engaging portion is of at least 5 mm, preferably comprised between 5 and 10 mm.

The "blocking" of the valve means may also be obtained at insertion of the capsule a by creating a reaction force at the hysteresis curve of the spring means which cannot be further overcome by the forces of the centrifuged liquid on the valve means so that no further opening of the flow passage of the valve means is possible during centrifugation (at least in a clear discernible manner). For example, the axial reaction force during insertion of the engaging portion of the capsule in the valve means is set at 250 N on the valve means. In the centrifugal operation, the capsule is centrifuged at an operational speed which creates an axial force on the valve means lower or equal to 250 N. Thus, the axial component of the force of liquid is too low to further open the valve means during centrifugation. It is therefore ensured that the flow restriction passage is well defined by the structure of the capsule itself and/or as a result of the engagement of the capsule in the device during insertion.

As illustrated on FIG. 7, flow restriction passages 49 are formed resulting from the engagement of the top surface 31 of the valve engaging portion 30 and the contact surface 50 of the pressing ring. The flow restriction passages are preferably of a very small cross section to provide a pressure gradient in the capsule and to set up the flow rate of the centrifuged beverage. The flow rate may be set up in a range comprised between 0.5 and 5 ml/second. The flow rate highly depends on the rotational speed but these values are valid for a speed comprised between 2500 and 6000 rpm. These passages are thus oriented radially to provide a liquid communication from the inner surface 33 of the valve engaging portion to the outer surface 34. As also apparent in FIG. 6, the flange portion may be pinched by a pinching portion 51 of the engaging plate 17 of the device while leaving larger passages 52 for the beverage upstream of the flow restriction passages 49. The engaging plate 17 also comprises perforating extraction means such as a series of blades, needles or pyramids 53 which perforate the foil 44 to allow the centrifuged beverage to flow in radial direction. Further upstream, the peripheral openings 43 of the lid may filter the beverage to ensure that the large solid particles are retained in the compartment, e.g., the non-soluble coffee grains. The openings may also be combined to a separate filter element placed adjacent or below the openings 43.

Figure 13:
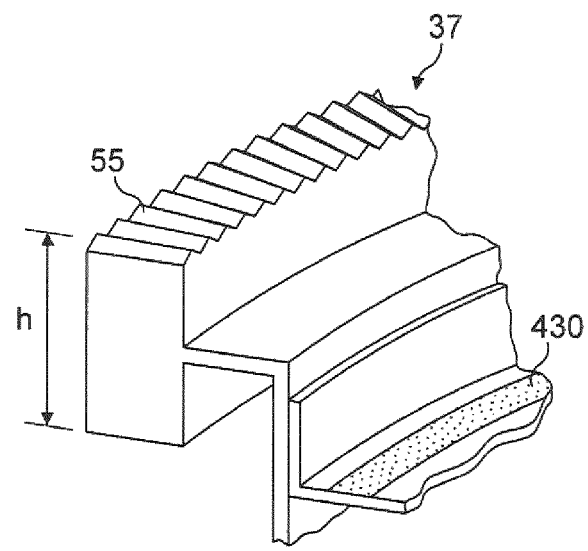
FIG. 13 shows a detail of the capsule of FIGS. 10 and 11 according to a third embodiment.
Figure 14:
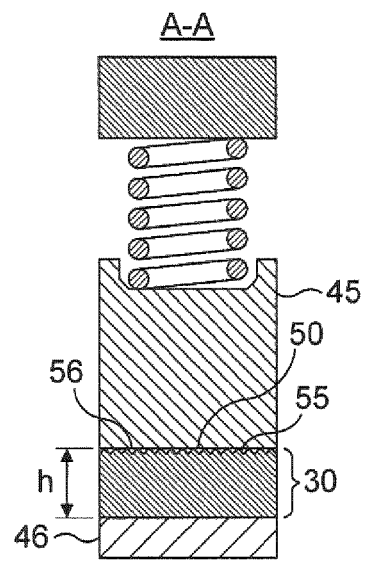
FIG. 14 is a cross-section along line A-A of FIG. 6 according to the second embodiment.
Figure 15:
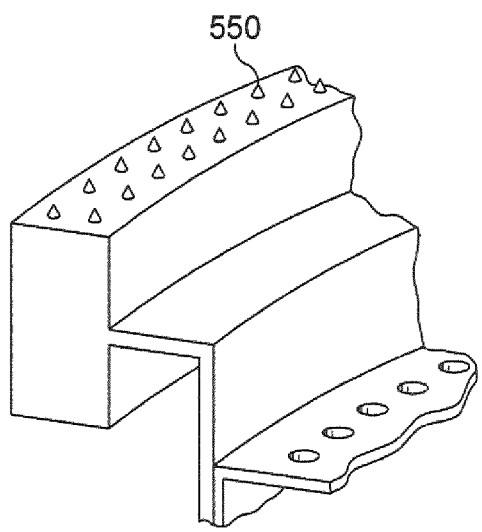
FIG. 15 shows a detail of the capsule of FIGS. 10 and 11 according to a fourth embodiment.

A second embodiment of the capsule 2B of the invention is illustrated in FIGS. 10 to 15. The capsule has the same characteristics as the capsule of the first embodiment except that the outlet structure 37 of the valve engaging portion 30 comprises a top surface 55 with knurls. The top surface is corrugated in the radial direction to form a multitude of knurls. When the capsule is engaged in the device as illustrated in FIG. 14, the knurls on the top surface of the valve engaging portion 30 of the capsule cooperate with a relatively flat contact or pressing surface 50 of the pressing ring 45 to delimit radial passages 56. The height of the knurls may be (as measured from their base to their crest) comprised between 5 and 500 microns, preferably between 5 and 50 microns, most preferably between 10 and 30 microns. The longest distance between two adjacent knurls, such as measured at the crest, is preferably comprised between 10 and 350 microns. The knurls may have a pyramidal or triangular cross-section or a rectangular cross-section. The knurls may abut a their base when pyramidal or triangular.

In the embodiment of FIG. 13, the filter openings are obtained by a band of porous material 56.

In the embodiment of FIG. 14, the knurls are replaced by a multitude of small spikes or small studs. When the capsule is engaged in the device, this structure creates a labyrinth or tortuous flow path for the beverage on the top surface of the valve engaging surface.

Figure 16:
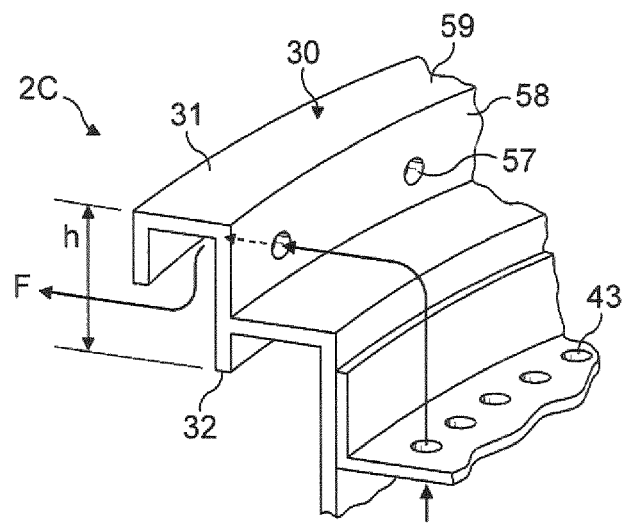
FIG. 16 shows a detail of the capsule of FIGS. 10 and 11 according to a fifth embodiment.
Figure 17:
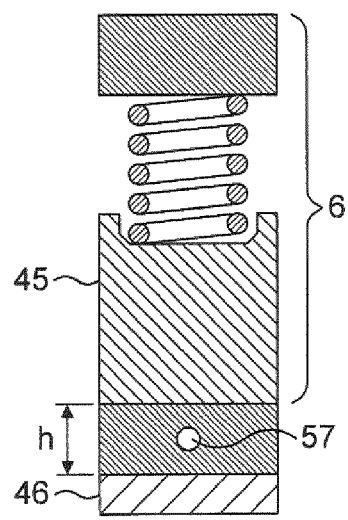
FIG. 17 is a cross-section along line A-A of FIG. 6 according to the fifth embodiment of FIG. 16.

In the embodiment of capsule 2C of FIG. 16, the valve engaging portion 30 comprises through-openings 57. In particular, the valve engaging portion is formed as an inverted L-shaped profile with an upward tubular wall 58 and a transversal upper engaging wall 59. The height "h" of the valve engaging portion 30 is here measured between the top surface 31 of the wall 59 and the bottom surface 32 of the tubular wall 58. The arrow "F" shows the flow path of the centrifuged beverage leaving the capsule in its way to the beverage collecting means of the device. The flow path starts from the compartment and travels through the openings 43 in the lid, then through the flow restriction openings 57 provided in the portion 30. The capsule 2C when engaged between the valve means of the device and the capsule holder is illustrated in FIG. 17. This figure shows that the only possible flow for the beverage is through openings 57 of the valve engaging portion whereas the valve means 6 is blocked due to a sufficient "h" of the engaging portion inserted between the flange 46 of the capsule holder and the pressing ring 45.

Figure 18:
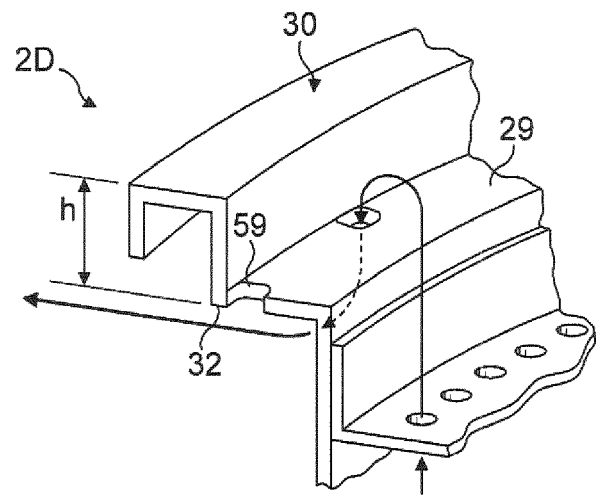
FIG. 18 shows a detail of the capsule of FIGS. 10 and 11 according to a sixth embodiment.
Figure 21:
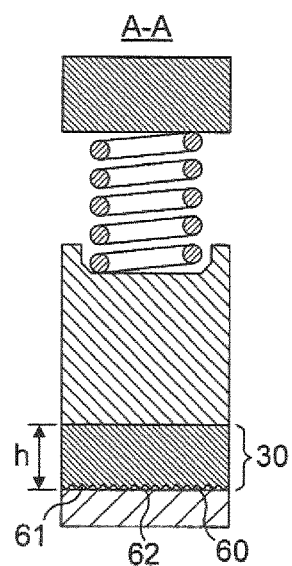
FIG. 21 is a cross-section along line A-A of FIG. 6 according to the seventh embodiment of FIG. 19.

In the embodiment of capsule 2D of FIG. 18, the outlet structure comprises openings 59 provided through the flange portion 29 of the capsule to enable the liquid to traverse the flange upstream of the valve engaging portion and communicate in a recess or interstice between the flange portion and the capsule holder. The lower surface 32 of the valve engaging portion is provided with an outlet structure such as knurls or grooves 60 and the like to form restriction passages 61 for the flow of beverage in conjunction with the upper surface 62 of the capsule holder as illustrated on FIG. 21. Again the height "h" of the valve engaging portion is sufficient to maintain the valve in a blocked position so that the flow of beverage can only pass through the restriction passages 61.

Figure 19:
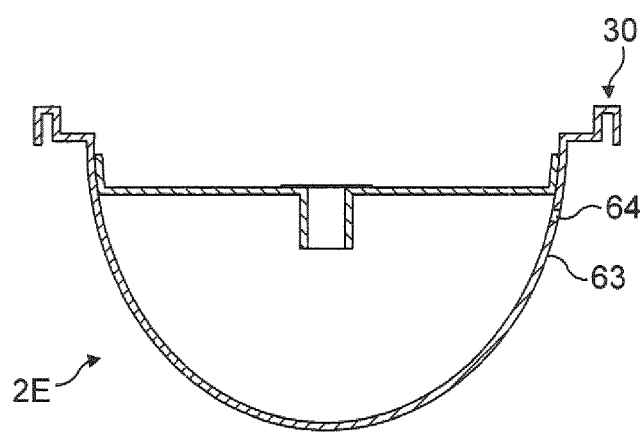
FIG. 19 shows a cross-section of a capsule according to a seventh embodiment.
Figure 20:
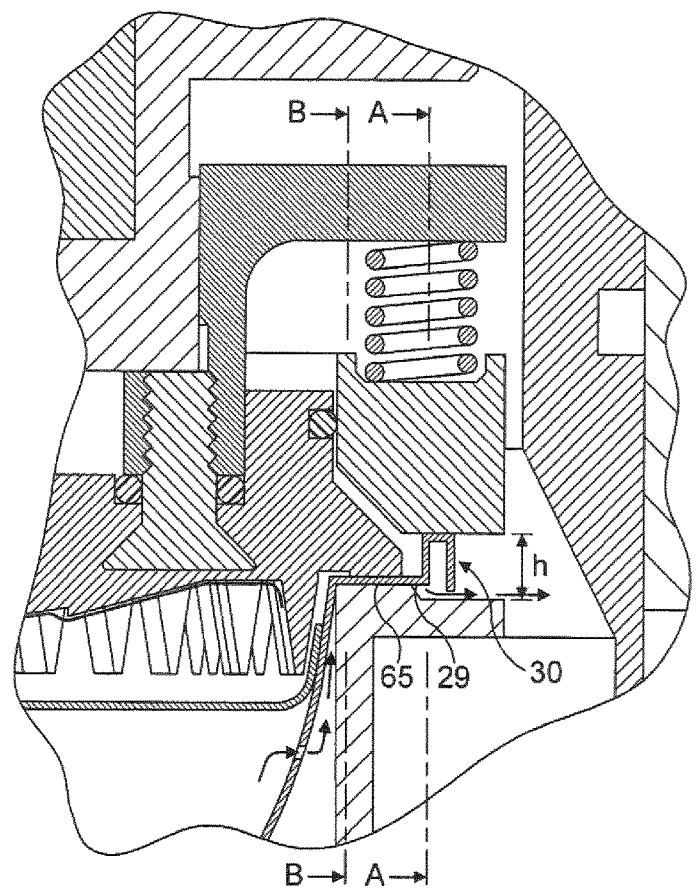
FIG. 20 is a detail in cross-section of the capsule system using a capsule according to the seventh embodiment of FIG. 19.
Figure 22:
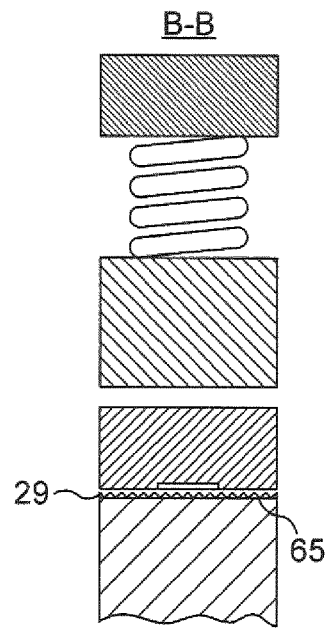
FIG. 22 is a cross-section along line B-B of FIG. 6 according to the seventh embodiment of FIG. 19.

In the embodiment of capsule 2E of FIG. 19, the capsule also comprises a body and a lid connected to the body. The lid closes the body at its periphery. In other words, the lid has no filter openings and the openings 43 present in the previous embodiments have been removed. The side wall 63 of the body comprises openings 64 allowing the centrifuged beverage to leave the capsule as illustrated in FIG. 20. Furthermore, the capsule comprises a valve engaging portion 30 of determined height "h". As illustrated in FIG. 22, in order to allow the beverage to traverse the flange portion 29 of the capsule, its lower surface 65 comprises an outlet structure such as knurls, grooves, spikes, studs and the like.

Figure 23:
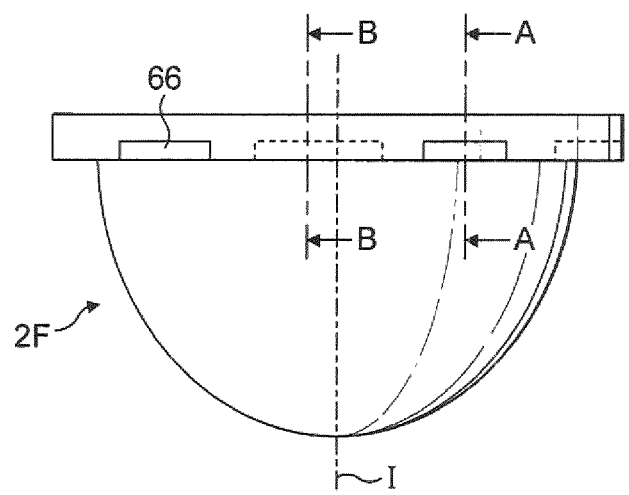
FIG. 23 shows a side view of a capsule according to an eighth embodiment.
Figure 24:
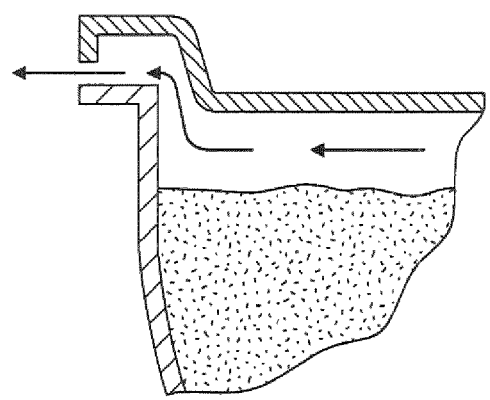
FIG. 24 shows a cross-section view along line A-A of FIG. 23.
Figure 25:
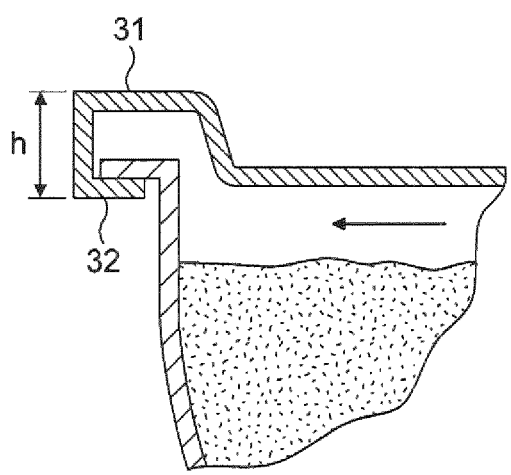
FIG. 25 shows a cross-section view along line B-B of FIG. 23.

In the embodiment of capsule 2F of FIG. 23, the outlet structure is formed of openings, such as thin slots 66, provided between the lid and the body of the capsule. As illustrated in FIG. 24, the openings may be cutouts formed in a peripheral edge of the lid and/or body. As also illustrated in FIG. 25 showing the assembly at a different radial section, the edge of the lid defines a valve engaging portion with an upper surface 31 and bottom surface 33 distant from height "h". It should be noted that, in a possible solution, the lid and the body can be rotated relative to one another along axis I for adjusting the size of the openings or slots.

Figure 26:
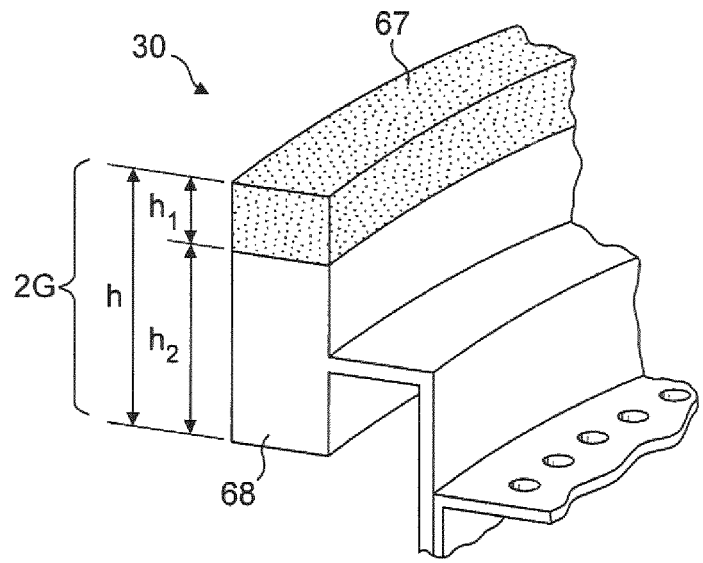
FIG. 26 shows a detail of a capsule according to a ninth embodiment.
Figure 27:
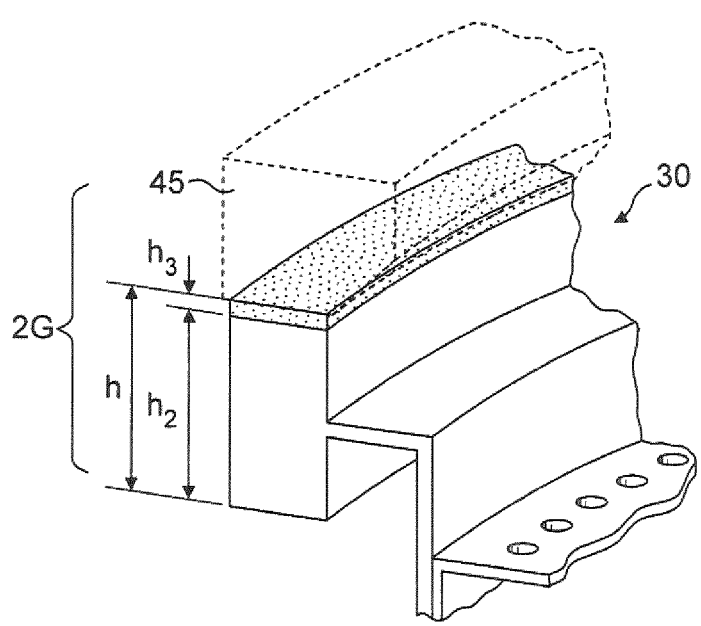
FIG. 27 shows a detail of a capsule according to a tenth embodiment.

In the embodiment of capsule 2G of FIGS. 26 and 27, the outlet structure is formed by a layer 67 of liquid porous material. The porosity must be oriented at least in radial direction. The layer may be sufficiently rigid for resisting to the deformation when the pressing ring 45 is compressed thereon. For example, it can be a layer made of sintered or plastic or metal or rigid foam. In this case, the height "h" of the valve engaging portion is determined by the sum of "h1" which represents the thickness of the layer of liquid porous material and "h2" which represents the thickness of the non-porous part 68 of the valve engaging portion. The beverage therefore flows through the porous layer in direction of the collecting means of the device.

In an alternative illustrated in FIG. 27, the layer of porous material is partially compressible under load of the valve means. In such case, the height "h" of the valve engaging portion 30 of the capsule is determined by the sum of the thickness "h3" which represents the thickness of the layer in the compressed state and the thickness "h2" which represents the thickness of the non-porous part 68 of the valve engaging portion.

It should be noted that the pressing ring 45 can be made (in general) of a slightly compressible material such as a rubber or hard foam.

Of course, a layer of porous material can form the outlet structures of the described embodiments in replacement to, e.g., the grooves, knurls, spikes or studs.

Figure 28:
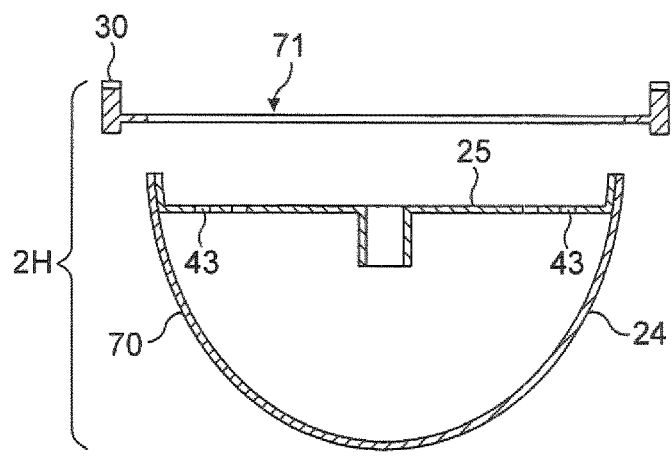
FIG. 28 is a cross sectional view of the kit including a capsule and an insert along line A-A according to a eleventh embodiment.
Figure 29:
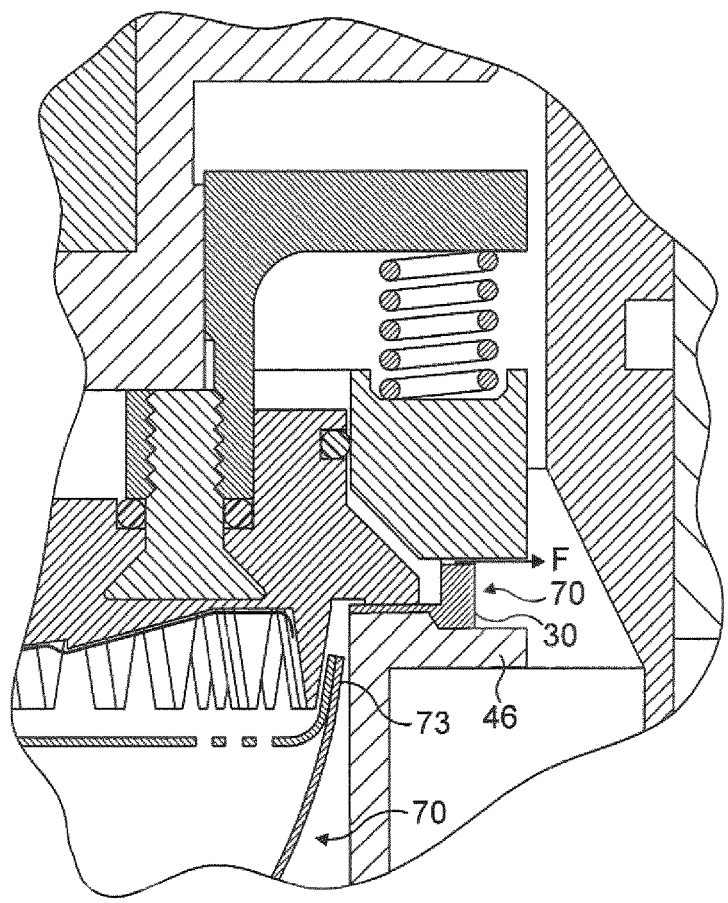
FIG. 29 shows a detail in cross-section of the capsule system using a kit of capsule according to the eleventh embodiment in a variant of the device of FIG. 6.

FIGS. 28 and 29 relate to a beverage capsule kit 2H comprising a capsule 70 without outwardly protruding flange and a separate insert 71 forming the engaging valve portion 30. The insert 71 has the shape of a ring and is dimensioned to match the supporting flange 46 of the capsule holder as illustrated on FIG. 29. The capsule 70 comprises a cup-shaped body 24 and a lid 25 partially closing the body. The body has no laterally protruding flange. The body and lid can be connected by an upward flange portion 73, e.g., which ends below the level of the insert. The lid may comprise flow openings 43. The engaging valve portion 30 may be designed with the flow restriction passages being configured according to any of the aforementioned embodiments.

Figure 30:
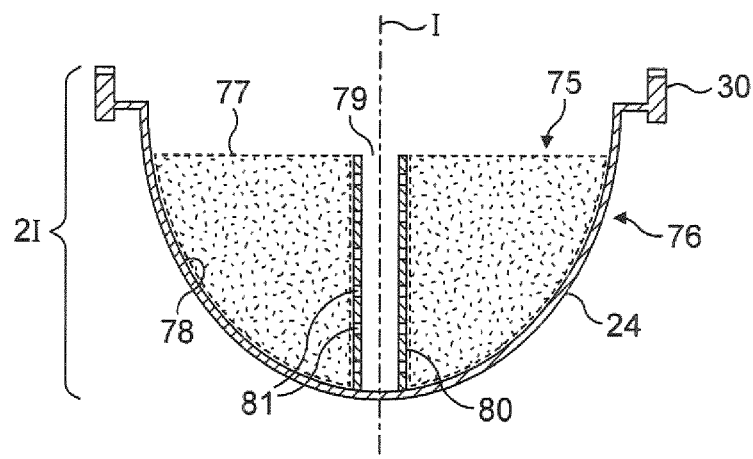
FIG. 30 shows a cross sectional view of a kit including a filter pod and a pod holder along line A-A according to a twelfth embodiment.
Figure 31:
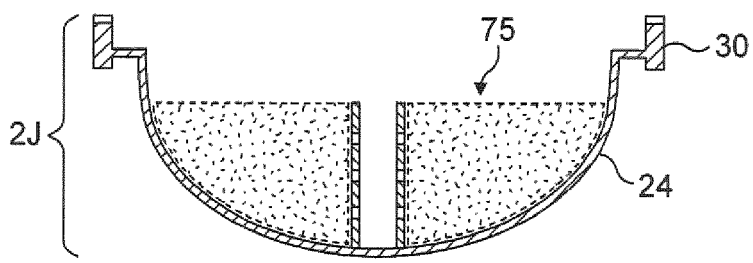
FIG. 31 shows a cross sectional view of a kit including a filter pod and a pod holder of smaller size along line A-A according to the twelfth embodiment.
Figure 32:
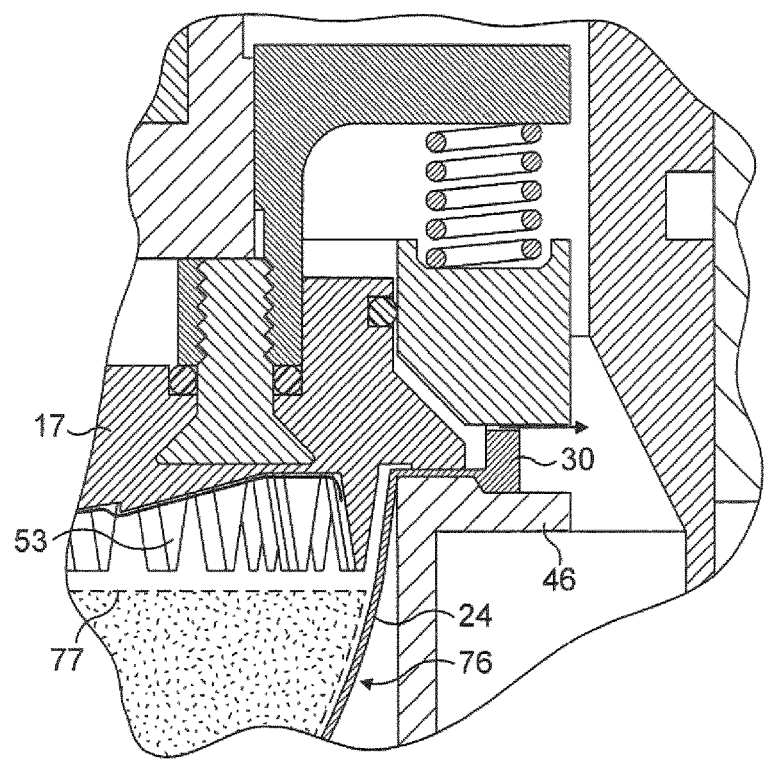
FIG. 32 shows a detail in cross-section of the capsule system using a capsule according to the eleventh embodiment in a variant of the device of FIG. 6.

FIGS. 30 to 32 relate to another embodiment in which the capsules 21 and 2J are formed of a filter pod 75 which fits into a pod receiver 76. The pod receiver forms a cup-shaped body 24 which extends by a valve engaging portion 30. The filter pod comprises a compartment with a porous upper wall 77 forming, for instance, the lid of the capsule when the two parts 75, 76 are assembled together. The upper wall 77 connects to a sidewall and bottom wall 78 which may be porous or, alternatively impervious to liquid. The pod may comprise a central recess 79 for enabling a tubular liquid distribution tube 80 of the receiver to be fitted in. The tube 80 is traversed by at least two, preferably a multitude of flow inlets 81. In this embodiment, the filter pod may be formed of a flexible liquid porous material such as filter paper, woven or non woven or a combination of these flexible porous material and liquid impervious foil material such as an aluminium and/or polymer. As illustrated on FIG. 32, the filter pod is dimensioned so that its upper wall 77 comes below the perforating extraction means 53 of the device when the capsule is inserted in the capsule holder and the engaging plate 17 is engaged on the receiver. As a result, the pod is not perforated by the extraction means 53 and the beverage (e.g., coffee extract) can be properly filtered.

For all the embodiment of the capsules, the lid may be flexible, semi-rigid or rigid. The body can also be flexible, semi-rigid or rigid. Both can be made of aluminum, plastic or biodegradable polymer such as PLA or starch and combinations thereof. Parts of the capsule can also be formed of cellulose such as paper filter or textile such as woven or non woven material.

Figure 33:
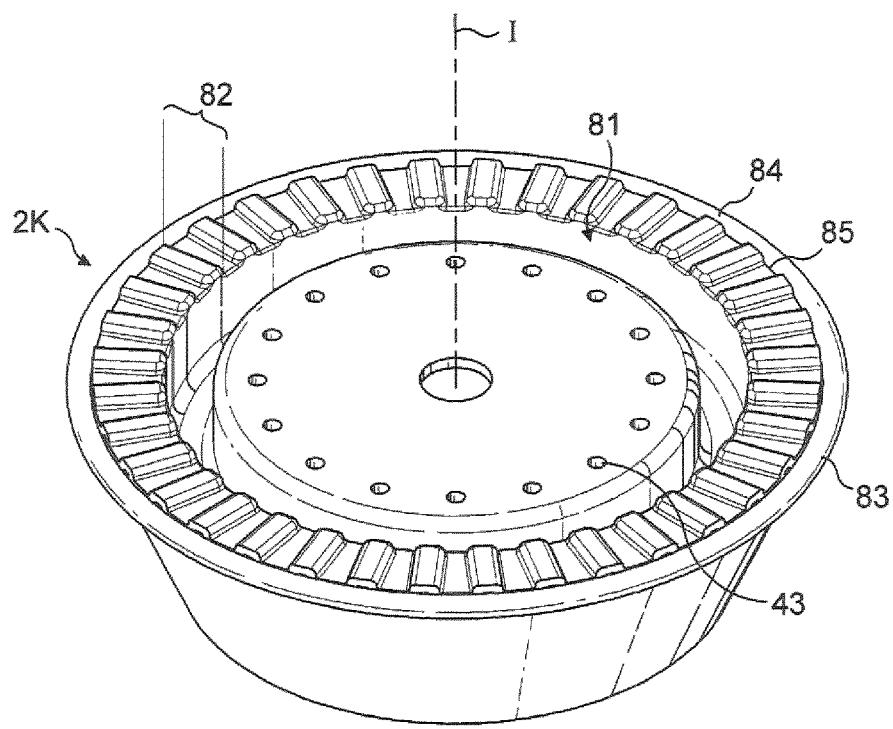
FIG. 33 shows a perspective view of a capsule according to a thirteen embodiment.
Figure 34:
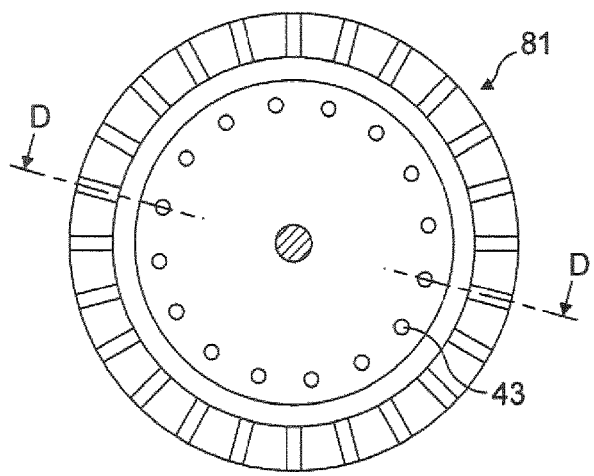
FIG. 34 shows a top view of the capsule of FIG. 3.
Figure 37:
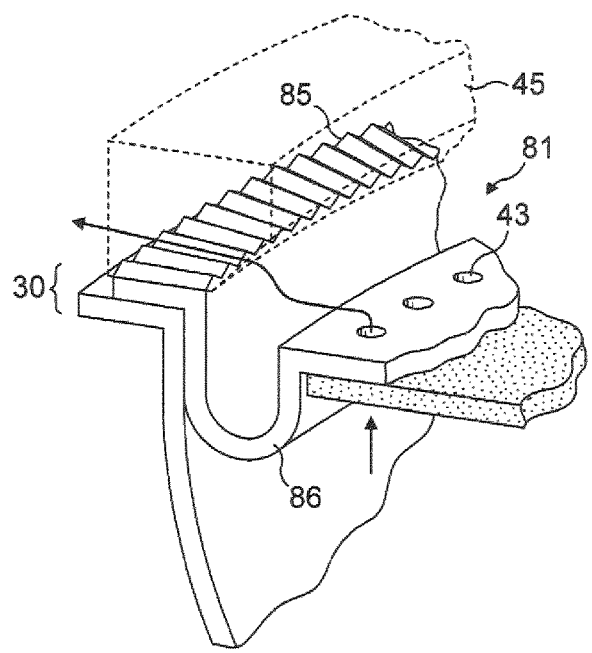
FIG. 37 shows a detail of the capsule of FIGS. 33 and 34 during beverage extraction.
Figure 38:
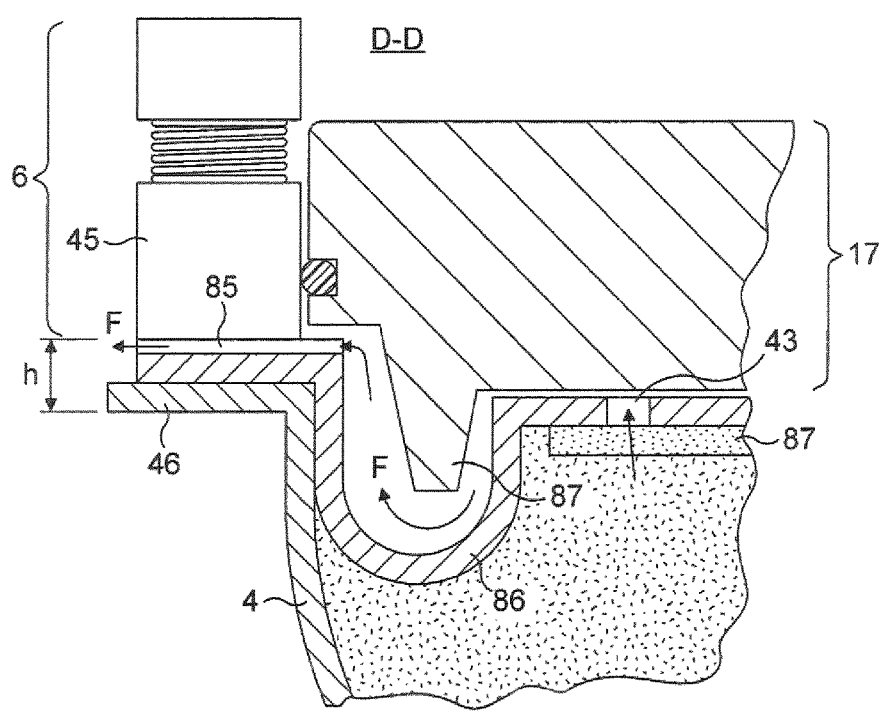
FIG. 38 shows a cross sectional view of the capsule of FIGS. 33 and 34 in a beverage preparation device.
Figure 39:
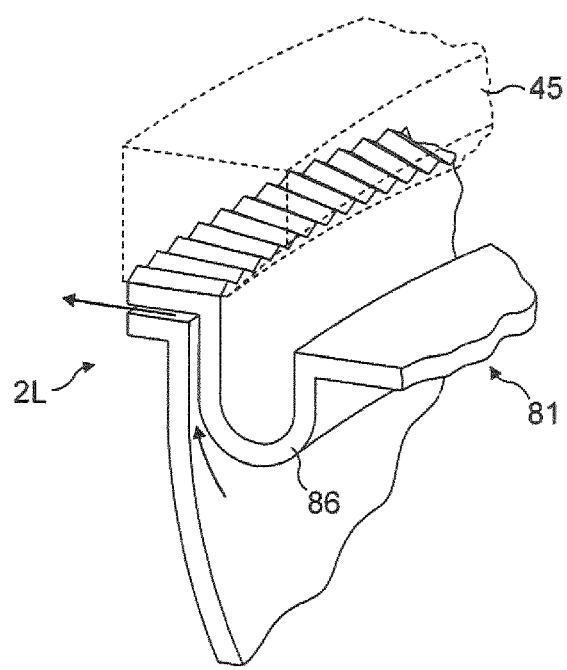
FIG. 39 shows a detail of the capsule of FIG. 36.
Figure 40:
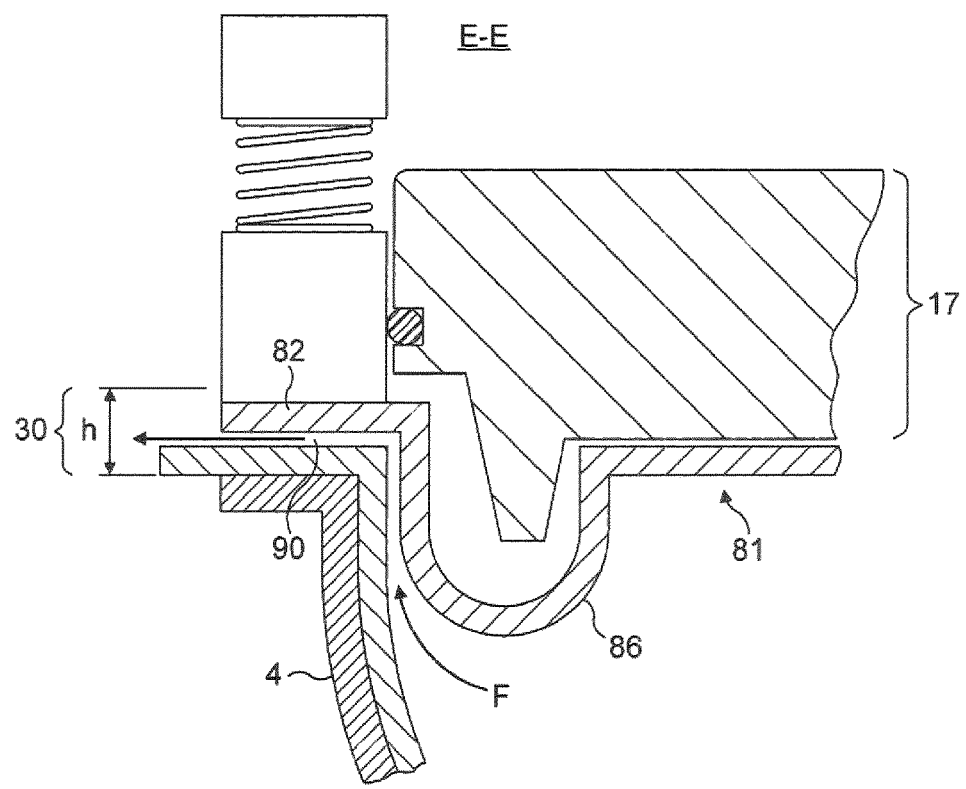
FIG. 40 shows a cross sectional view of the capsule of FIGS. 36 and 39 in a beverage preparation device during extraction.

FIGS. 33, 34 and 37 illustrate another embodiment for the capsule 2K of the invention. It comprises a cup-shaped body 80 and a lid 81. The lid is configured with a flange portion 82 fitting at least partially on a flange portion 83 of the body. The flange portion is formed of a multitude of protrusions 84 and channels 85 distributed on the circumference of the portion and extending individually radially. The combination of the flange portions 82, 83 forms the valve engaging portion 30 of height "h" enabling to place the valve means of the device in compression as illustrated in FIG. 38. The lid 81 further comprises a peripheral recess 86 close to the flange in order to allocate room for the extraction or perforating means 87 of the device when the engaging plate 17 of the device engages with the lid of the capsule. FIG. 38 further shows the beverage flow moving under the forces of centrifugation and traversing the peripheral openings 43 provided on the lid, flowing through the recess 86 and passing through the channels 85 provided on the portion of flange of the lid. An additional filter 87 can be placed between the openings 43 and the cavity of the capsule, such as affixed to the internal surface of the lid.

Figure 35:
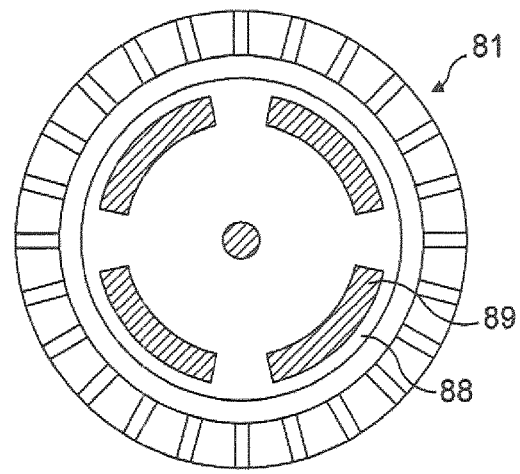
FIG. 35 shows a variant of FIG. 34.
Figure 36:
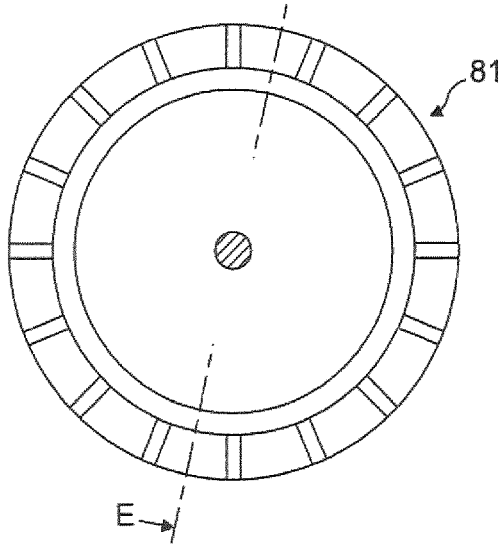
FIG. 36 shows a second variant of FIG. 35.

FIG. 35 shows a variant of the capsule 2K, more particularly, where the lid has large arc-shaped openings 88 covered by a filter 89 such as filter paper, woven or non woven fabric and combinations thereof.

Finally, FIGS. 36 to 40 illustrate a capsule 2L in which the lid is free of the peripheral through-openings 43. The variation here is that the lower surface of the portion of flange 82 of the lid comprises the protrusions and channels 90. Such structure of flow passage can be obtained by embossing of the flange portion. As apparent on FIG. 40, the flow of the centrifuged beverage traverses the channels 90 present between the lid and body.

EXAMPLES

The invention is further defined by the following examples. The drawings also serve for illustrating these examples without limitation in detail.

Example 1

Beverage capsule (2, 2A, 2B, 2C, 2D, 2E, 2F, 2G, 2H, 2I, 2J, 2K, 2L) for preparing a beverage in a beverage preparation device (3) from a capsule containing beverage ingredients by passing water through the ingredients contained in the capsule using centrifugal forces, said device comprising means for driving the capsule in rotation around an axis of rotation (I), a capsule holder (4) for receiving the capsule and a water injection means (5) for injecting water in the capsule, said device further comprising a resilient valve means (6) for engaging a valve engaging portion (30) of the capsule; said valve means comprising a pressing ring (45); the capsule comprising a body (24) and a lid (25) delimiting a compartment (26) containing beverage ingredients (27) and a valve engaging portion (30) designed for being inserted between the capsule holder (4) and the valve means (6) of the device;
wherein said capsule comprises an outlet structure (35) forming beverage flow restriction passages (36) of defined cross-section in the capsule obtained at such and/or as a result of the insertion of the valve engaging portion (30) between the capsule holder and the pressing ring of the valve means, wherein the valve engaging portion of the capsule has an axial dimension (h) such that, before the extraction of the beverage from the capsule, the pressing ring of the valve means is stressed by the valve engaging portion to an axial force and/or axial distance such that, during the extraction by rotating the capsule in the device, the pressing ring no longer moves by the pressure of the centrifuged beverage on the valve means within the operational rotational speed and the flow of beverage is only funneled through the said flow restriction passages.

Example 2

Beverage capsule (2, 2A, 2B, 2C, 2D, 2E, 2F, 2G, 2H, 2I, 2J, 2K, 2L) for preparing a beverage in a beverage preparation device (3) from a capsule containing beverage ingredients by passing water through the ingredients contained in the capsule using centrifugal forces, said device comprising means for driving the capsule in rotation around an axis of rotation (I), a capsule holder (4) for receiving the capsule and a water injection means (5) for injecting water in the capsule, said device further comprising a resilient valve means (6) for engaging a valve engaging portion (30) of the capsule; said valve means comprising a pressing ring (45); the capsule comprising a body (24) and a lid (25) delimiting a compartment (26) containing beverage ingredients (27) and a valve engaging portion (30) designed for being inserted between the capsule holder (4) and the valve means (6) of the device;
wherein said capsule comprises an outlet structure (35) forming beverage flow restriction passages (36) of defined cross-section in the capsule obtained at such and/or as a result of the engagement of the valve engaging portion (30) with the capsule holder and the pressing ring of the valve means,
wherein the valve engaging portion (30) has an axial dimension (h) of at least 5 mm.

Example 3

Beverage capsule according to any of EXAMPLES 1 or 2, wherein, the valve engaging portion (30) of the capsule is designed for stressing the valve means (6) when the capsule is inserted between the capsule holder and the valve means, to such an extent that the pressing ring (45) abuts against a fully compressed elastic means (47) and/or against a solid abutment portion (48) of the device.

Example 4

Beverage capsule according to any one of EXAMPLES 1 to 3, wherein the valve engaging portion (30) extends outwardly and above a transversal flange portion (29) of the capsule.

Example 5

Beverage capsule according to EXAMPLE 4, wherein said valve engaging portion (30) extends further below the flange portion of the capsule.

Example 6

Beverage capsule according to EXAMPLE 1 wherein the valve engaging portion (30) has an axial dimension (h) of at least 5 mm.

Example 7

Beverage capsule according to any of the preceding EXAMPLES 1 to 6, wherein the outlet structure (35) is formed on a top surface (31, 37) or edge of the valve engaging portion (30); said top surface or edge being arranged to come in abutment against the pressing ring (45) of the valve means when the capsule is inserted in the device.

Example 8

Beverage capsule according to EXAMPLE 7, wherein the outlet structure is formed of a plurality of radially oriented grooves (36) or knurls (55, 60) distributed on the circumference of the engaging portion.

Example 9

Beverage capsule according to EXAMPLE 7, wherein the outlet structure is formed by a labyrinth-type structure obtained such as grooves (36), knurls (55), spikes, studs (550) and the like provided on a top surface (31, 37) or edge of the engaging portion.

Example 10

Beverage capsule according to EXAMPLE 7, wherein the outlet structure comprises a plurality of radially oriented through-openings (57) formed in the valve engaging portion (30).

Example 11

Beverage capsule according to EXAMPLE 10, wherein the outlet structure is formed of openings (43) delimited between a cup-shaped body and a lid of the capsule connected to the body.

Example 12

Beverage capsule according to EXAMPLES 10 or 11, wherein the outlet structure forms openings (66) of controllably variable cross-section.

Example 13

Beverage capsule according to any of the preceding EXAMPLES 1 to 12, wherein the outlet structure is formed by flow restriction passages (61) such as radial grooves (60), knurls, spikes or studs and the like on the bottom surface or edge of the valve engaging portion; said surface or edge being designed for coming in abutment against a support surface of the capsule holder.

Example 14

Beverage capsule according to EXAMPLE 13, wherein the capsule further comprises openings (64) provided through the sidewall (63) of its body.

Example 15

Beverage capsule according to any of the preceding EXAMPLES 1 to 14, wherein the outlet structure is formed of at least one layer (67) of porous material such as a woven or non woven, filter paper, sponge or foam.

Example 16

Beverage capsule according to any of the preceding EXAMPLES 1 to 15, wherein the lid (37) comprises a transversal portion which is positioned, towards the cavity (26) of the capsule, inset relative to the flange of the capsule in order to form a recess (86) below extraction perforating means (53) of the device when the capsule is in insertion position in the device; said inner portion further comprising filtering openings (43, 430) located at its periphery for filtering the beverage leaving the compartment.

Example 17

Beverage capsule according to of the preceding EXAMPLES 1 to 16, wherein it comprises a filter pod (75) forming a porous compartment and a pod receiver (76) for receiving the filter pod.

Example 18

Beverage capsule according to EXAMPLE 17, wherein the filter pod (75) has a torus shape.

Example 19

Beverage capsule according to EXAMPLE 17 or 18, wherein the pod receiver comprises the valve engaging portion.

Example 20

Beverage capsule kit (2H) for preparing a beverage in a beverage preparation device comprising from a capsule containing beverage ingredients by passing water through the ingredients contained in the capsule using centrifugal forces, said kit comprising a capsule and an insert (71) separable or separate from the capsule comprising a valve engaging portion (30), said device comprising means for driving the capsule in rotation around an axis of rotation (I), a capsule holder for receiving the capsule and a water injection means for injecting water in the capsule, said device further comprising a resilient valve means for engaging the said valve engaging portion of the insert; said valve means comprising a pressing ring;

the capsule (70) comprising a body (24) and a lid (25) delimiting a compartment containing beverage ingredients, said valve engaging portion of the insert (71) being designed for being inserted between the capsule holder and the valve means of the device;

wherein said insert and/or capsule comprises an outlet structure forming beverage flow restriction passages of defined cross-section in the capsule at such and/or as a result of the engagement of the valve engaging portion of the insert with the capsule holder and the pressing ring of the valve means, wherein the valve engaging portion of the capsule has an axial dimension (h) such that, before the extraction of the beverage from the capsule, the pressing ring of the valve means is stressed by the valve engaging portion to an axial force and/or axial distance such that, during the extraction by rotating the capsule, the pressing ring no longer moves by the pressure of the centrifuged beverage on the valve means within the operational rotational speed and the flow of beverage is only funneled through the said flow restriction passages.

Example 21

Beverage capsule system for preparing a beverage from a capsule containing beverage ingredients in a beverage preparation device by passing water through the ingredients contained in the capsule using centrifugal forces comprising:
- a device (3) comprising means for driving the capsule in rotation around an axis of rotation (I), a capsule holder for receiving the capsule and a water injection means for injecting water in the capsule,
- said device further comprising a valve means for engaging a peripheral outlet portion of the capsule; said valve means comprising a pressing ring and an elastic means acting on the pressing ring,
- a capsule (2, 2A, 2B, 2C, 2D, 2E, 2F, 2G, 2H, 2I, 2J, 2K, 2L) containing beverage ingredients and a valve engaging portion designed for being inserted between the capsule holder and the valve means of the device;
- wherein said capsule comprises an outlet structure forming beverage flow restriction passages of defined cross-section in the capsule at such and/or as a result of the engagement of the valve engaging portion with the capsule holder and the pressing ring of the valve means,
- wherein the valve engaging portion of the capsule has an axial dimension (h) such that, before the extraction of the beverage from the capsule, the pressing ring of the valve means is stressed by the valve engaging portion to an axial force and/or axial distance such that, during the extraction by rotating the capsule in the device, the pressing ring no longer moves by the pressure of the centrifuged beverage on the valve means within the operational rotational speed and the flow of beverage is only funneled through the said flow restriction passages.

Example 22

Beverage capsule (2B) for preparing a beverage in a beverage preparation device (3) from a capsule containing beverage ingredients by passing water through the ingredients contained in the capsule using centrifugal forces,
the capsule comprising a cup-shaped body (24) and a lid (25) delimiting a compartment (26) containing beverage ingredients (27); the body extending upwardly and outwardly beyond the lid (25) by a valve engaging portion (30) designed for being inserted between the capsule holder (4) and the valve means (6) of the device;
wherein the valve engaging portion (30) comprises a top surface covered all along its circumference with a multitude of knurls (55) or studs (550).

Example 23

Beverage capsule according to EXAMPLE 22, wherein the knurls or studs have a height comprised between 5 and 500 microns, preferably between 5 and 50 microns, most preferably between 10 and 30 microns.

Example 24

Beverage capsule according to EXAMPLES 22 or 23, wherein the longest distance between two adjacent knurls, such as measured at the crest, is preferably comprised between 10 and 350 microns.

Example 25

Beverage capsule according to EXAMPLES 22 to 24, wherein the knurls have a pyramidal or triangular cross-section or a rectangular cross-section.

Example 26

Beverage capsule according to EXAMPLE 25, wherein the knurls abut a their base with no distance.

Example 27

Beverage capsule according to EXAMPLE 22, wherein the studs are distributed along the circumference of the top surface.

Example 28

Beverage capsule according to EXAMPLE 27, wherein studs are further distributed in radial direction.

Example 29

Beverage capsule (2B) for preparing a beverage in a beverage preparation device (3) from a capsule containing beverage ingredients by passing water through the ingredients contained in the capsule using centrifugal forces, the capsule comprising a cup-shaped body (24) and a lid (25) delimiting a compartment (26) containing beverage ingredients (27); the body extending upwardly and outwardly beyond the lid (25) by a valve engaging portion (30) designed for being inserted between the capsule holder (4) and the valve means (6) of the device;
wherein the valve engaging portion (30) is formed on the top surface by an assembly of walls both in radial and transversal directions forming a labyrinth-like arrangement capable of reducing the liquid flow velocity in radial direction.

Example 30

Beverage capsule (2C) for preparing a beverage in a beverage preparation device (3) from a capsule containing beverage ingredients by passing water through the ingredients contained in the capsule using centrifugal forces,
the capsule comprising a cup-shaped body (24) and a lid (25) delimiting a compartment (26) containing beverage ingredients (27); the body extending upwardly and outwardly beyond the lid (25) by a valve engaging portion (30) designed for being inserted between the capsule holder (4) and the valve means (6) of the device;
wherein the valve engaging portion (30) has an upright wall (58) provided with a multitude of through-openings (57) extending radially.

Example 31

Beverage capsule (2C) according to EXAMPLE 30, wherein the lid comprises through-openings (43) in the vicinity of the valve engaging portion (30).

Example 32

Beverage capsule (2D) for preparing a beverage in a beverage preparation device (3) from a capsule containing beverage ingredients by passing water through the ingredients contained in the capsule using centrifugal forces, the capsule comprising a cup-shaped body (24) and a lid (25) delimiting a compartment (26) containing beverage ingredients (27); the body extending upwardly and outwardly beyond the lid (25) by a valve engaging portion (30) designed for being inserted between the capsule holder (4) and the valve means (6) of the device;

wherein the valve engaging portion (30) extends from a flange portion (29); said flange portion extending in a radial direction and being provided with through-openings (59) to enable liquid flow to traverse the flange, upstream of the valve engaging portion and in a direction below the valve engaging portion (30).

Example 33

Beverage capsule (2E) for preparing a beverage in a beverage preparation device (3) from a capsule containing beverage ingredients by passing water through the ingredients contained in the capsule using centrifugal forces, the capsule comprising a cup-shaped body (24) and a lid (25) delimiting, with the body, a compartment (26) containing beverage ingredients (27); the body extending upwardly and outwardly beyond the lid (25) by a flange comprising a valve engaging portion (30) designed for being inserted between the capsule holder (4) and the valve means (6) of the device;

wherein the side wall of the body comprises openings (64) distributed all along the circumference of the wall and below the flange.

Example 34

Beverage capsule (2G) for preparing a beverage in a beverage preparation device (3) from a capsule containing beverage ingredients by passing water through the ingredients contained in the capsule using centrifugal forces, the capsule comprising a cup-shaped body (24) and a lid (25) delimiting, with the body, a compartment (26) containing beverage ingredients (27); the body extending upwardly and outwardly beyond the lid (25) by a flange comprising a valve engaging portion (30) designed for being inserted between the capsule holder (4) and the valve means (6) of the device;

wherein the valve engaging portion (30) has a thickness (h2) made of a material not porous to liquid and on top of it, an additional flow structure of thickness (h1) formed of a layer (67) of material which is porous to liquid in radial direction.

Example 35

Beverage capsule according to EXAMPLE 34, wherein the layer (67) of material which is porous to liquid is formed of a sintered or foam material.

Example 36

Beverage capsule for preparing a beverage in a beverage preparation device from a capsule containing beverage ingredients by passing water through the ingredients contained in the capsule using centrifugal forces, said device comprising means for driving the capsule in rotation around an axis of rotation (I), a capsule holder for receiving the capsule and a water injection means for injecting water in the capsule, said device further comprising a valve means for engaging a valve engaging portion of the capsule; said valve means comprising a pressing ring;

the capsule comprising a body and a lid and a valve engaging portion designed for being inserted between the capsule holder and the valve means of the device;

wherein said capsule comprises an outlet structure forming beverage flow restriction passages of defined cross-section in the capsule at such and/or as a result of the insertion of the valve engaging portion between the capsule holder and the pressing ring of the valve means.

Example 37

Beverage capsule according to EXAMPLES 22 to 36, wherein the valve engaging portion (30) has an axial length (h) of at least 5 mm.

Example 38

Beverage capsule according to EXAMPLES 22 to 36, wherein the valve engaging portion (30) has an axial length (h) lower than 5 mm.

Example 39

Use of a capsule according to any of the EXAMPLES 1 to 38, for preparing a beverage in beverage preparation device by rotating the capsule for passing water through the ingredients contained in the capsule using centrifugal forces.

The invention claimed is:

1. A beverage capsule for preparing a beverage in a beverage preparation device from the beverage capsule containing beverage ingredients by passing water through the beverage ingredients contained in the beverage capsule using centrifugal forces, the beverage preparation device comprising a driver for rotating the beverage capsule around an axis of rotation at an operational rotational speed, a capsule holder for receiving the beverage capsule and a water injector for injecting water in the beverage capsule, and a resilient valve for engaging a valve engaging portion of the beverage capsule, the resilient valve comprising a pressing ring, and the beverage capsule comprising:

a body;

a lid defining a compartment containing the beverage ingredients, the lid comprising a flange and a transversal portion, the transversal portion recessed into the compartment of the beverage capsule and comprising openings along a periphery of the transversal portion, and the openings having a diameter of less than 250 microns;

the valve engaging portion designed for being inserted between the capsule holder and the resilient valve of the beverage preparation device; and an outlet structure comprising beverage flow restriction passages of defined cross-section in the beverage capsule, the beverage flow restriction passages comprising a plurality of radially oriented grooves or knurls distributed on a top surface of the valve engaging portion or a labyrinth-type structure provided on a top surface or edge of the valve engaging portion, wherein the valve engaging portion of the beverage capsule has an axial dimension such that, before extraction of the beverage from the beverage capsule, the pressing ring of the resilient valve is stressed by the valve engaging portion to a feature selected from the group consisting of an axial force, an axial distance, and combinations thereof such that, during the extraction by rotating the beverage capsule in the beverage preparation device, the pressing ring no longer moves by a pressure of the centrifuged beverage on the resilient valve within the operational rotational speed and a flow of the beverage is only funneled through the flow restriction passages.

2. The beverage capsule according to claim 1, wherein the valve engaging portion extends outwardly and above a transversal flange portion of the beverage capsule.

3. The beverage capsule according to claim 1, wherein the valve engaging portion extends below a transversal flange portion of the beverage capsule.

4. The beverage capsule according to claim 1 wherein the valve engaging portion has an axial dimension of at least 5 mm.

5. The beverage capsule according to claim 1, wherein additional flow restriction passages are provided on a bottom surface of the valve engaging portion, the bottom surface designed for abutment against a support surface of the capsule holder.

6. The beverage capsule according to claim 5, wherein the body comprises a sidewall, and the beverage capsule comprises openings provided through the sidewall of the body.

7. The beverage capsule according to claim 1, wherein the outlet structure is formed of at least one layer of porous material.

8. The beverage capsule according to claim 1, wherein the beverage flow restriction passages comprise a plurality of knurls distributed on a circumference of the valve engaging portion or a labyrinth-type structure provided on a top surface or edge of the valve engaging portion.

* * * * *